(12) United States Patent
Kuang et al.

(10) Patent No.: US 12,400,325 B2
(45) Date of Patent: Aug. 26, 2025

(54) LUMBAR SPINE ANATOMICAL ANNOTATION BASED ON MAGNETIC RESONANCE IMAGES USING ARTIFICIAL INTELLIGENCE

(71) Applicant: The University of Hong Kong, Hong Kong (CN)

(72) Inventors: Xihe Kuang, Hong Kong (CN); Jason Py Cheung, Hong Kong (CN); Teng Zhang, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 532 days.

(21) Appl. No.: 17/854,230

(22) Filed: Jun. 30, 2022

(65) Prior Publication Data

US 2023/0005138 A1 Jan. 5, 2023

Related U.S. Application Data

(60) Provisional application No. 63/217,157, filed on Jun. 30, 2021.

(51) Int. Cl.
*G06V 20/70* (2022.01)
*G06T 3/4007* (2024.01)
(Continued)

(52) U.S. Cl.
CPC .......... *G06T 7/0012* (2013.01); *G06T 3/4007* (2013.01); *G06T 7/60* (2013.01);
(Continued)

(58) Field of Classification Search
CPC ....... G06T 7/0012; G06T 3/4007; G06T 7/60; G06T 7/70; G06T 2207/10088;
(Continued)

(56) References Cited

U.S. PATENT DOCUMENTS 11,571,256 B2 * 2/2023 Steinberg ................ G16H 20/40
2020/0202515 A1 * 6/2020 Prasad ....................... G06T 7/33
(Continued)

FOREIGN PATENT DOCUMENTS

CN 112528991 A * 3/2021 ........... G06F 18/241
JP 6218569 B2 * 10/2017 ............. A61B 5/055
KR 20210068713 A * 6/2021 ............. G06N 20/00

OTHER PUBLICATIONS

Lehnen, Nils Christian, et al. "Detection of degenerative changes on MR images of the lumbar spine with a convolutional neural network: a feasibility study." Diagnostics 11.5 (2021): 902. (Year: 2021).*

(Continued)

*Primary Examiner* — Henok Shiferaw
*Assistant Examiner* — Toluwani Mari-Jane Ijaseun
(74) *Attorney, Agent, or Firm* — Leason Ellis LLP

(57) ABSTRACT

A system for automated comprehensive assessment of clinical lumbar MRIs includes a MRI standardization component that reads MRI data from raw lumbar MRI files, uses an artificial intelligence (AI) model to convert the raw MRI data into a standardized format. A core assessment component automatically generates MRI assessment results, including multi-tissue anatomical annotation, multi-pathology detection and multi-pathology progression prediction based on the structured MRI data package. The core assessment component contains a semantic segmentation module that utilizes a deep learning artificial intelligence (AI) model to generate an MRI assessment results that contains multi-tissue anatomical annotation, a pathology detection module to generate multi-pathology detection, and a pathology progression prediction module to generate multi-pathology progression prediction. A model optimization component archives clinical MRI data and MRI assessment results (Continued)

based on comments provided by a specialist, and periodically optimizes the AI deep learning model of the core assessment component.

**4 Claims, 11 Drawing Sheets
(3 of 11 Drawing Sheet(s) Filed in Color)**

(51) Int. Cl.
```
G06T 7/00      (2017.01)
G06T 7/60      (2017.01)
G06T 7/70      (2017.01)
G06V 10/25     (2022.01)
G06V 10/26     (2022.01)
G06V 10/28     (2022.01)
G06V 10/774    (2022.01)
G06V 10/82     (2022.01)
```
(52) U.S. Cl.
CPC .......... *G06T 7/70* (2017.01); *G06V 10/25* (2022.01); *G06V 10/267* (2022.01); *G06V 10/28* (2022.01); *G06V 10/774* (2022.01); *G06V 10/82* (2022.01); *G06V 20/70* (2022.01); *G06T 2207/10088* (2013.01); *G06T 2207/20081* (2013.01); *G06T 2207/20084* (2013.01); *G06T 2207/30012* (2013.01); *G06V 2201/033* (2022.01)

(58) Field of Classification Search
CPC . G06T 2207/20081; G06T 2207/20084; G06T 2207/30012; G06T 7/11; G06T 2207/20076; G06T 2207/30101; G06V 10/25; G06V 10/267; G06V 10/28; G06V 10/774; G06V 10/82; G06V 20/70; G06V 2201/033; G06V 10/44; G06V 10/806; G06V 10/26; G06V 10/32
See application file for complete search history.

(56) References Cited

U.S. PATENT DOCUMENTS

2020/0373013 A1* 11/2020 Cao ................. G06T 7/0014
2023/0281807 A1*  9/2023 Kornreich ........... G06V 10/267
                                                            382/128

OTHER PUBLICATIONS

Wang, Chuanbo, et al. "Fully automatic intervertebral disc segmentation using multimodal 3D U-Net." 2019 IEEE 43rd Annual Computer Software and Applications Conference (COMPSAC). vol. 1. IEEE, 2019. (Year: 2019).*
Kelm, B. Michael, et al. "Spine detection in CT and MR using iterated marginal space learning." Medical image analysis 17.8 (2013) : 1283-1292. (Year: 2013).*
Neubert, Ales, et al. "Automated 3D segmentation of vertebral bodies and intervertebral discs from MRI." 2011 International Conference on Digital Image Computing: Techniques and Applications. IEEE, 2011. (Year: 2011).*
C. W. Pfirrmann, A. Metzdorf, M. Zanetti, J. Hodler, and N. Boos, "Magnetic resonance classification of lumbar Intervertebral disc degeneration," Spine, 2001, vol. 26, No. 17, pp. 1873-1878.
J. S. Ramos, M. T. Cazzolato, B. S. Faiçal, M. H. Nogueira-Barbosa, C. Traina, and A. J. Traina, "3DBGrowth: volumetric vertebrae segmentation and reconstruction in magnetic resonance imaging," in 2019 IEEE 32nd International Symposium on Computer-Based Medical Systems (CBMS), 2019, pp. 435-444.
S. Benameur, M. Mignotte, S. Parent, H. Labelle, W. Skalli, and J. de Guise, "3D/2D registration and segmentation of scoliotic vertebrae using statistical models," Computerized Medical Imaging Graphics, 2003, vol. 27, No. 5, pp. 321-337.
Z. Peng, J. Zhong, W. Wee, and J.-h. Lee, "Automated vertebra detection and segmentation from the whole spine MR images," in 2005 IEEE Engineering in Medicine and Biology 27th Annual Conference, 2006, pp. 2527-2530.
M. S. Aslan, A. Ali, D. Chen, B. Arnold, A. A. Farag, and P. Xiang, "3D vertebrae segmentation using graph cuts with shape prior constraints," in 2010 IEEE International Conference on Image Processing, 2010, pp. 2193-2196.
P. H. Lim, U. Bagci, and L. Bai, "Introducing Willmore flow into level set segmentation of spinal vertebrae," IEEE Transactions on Biomedical Engineering, 2012, vol. 60, No. 1, pp. 115-122.
A. Rasoulian, R. Rohling, and P. Abolmaesumi, "Lumbar spine segmentation using a statistical multi-vertebrae anatomical shape+ pose model," IEEE Transactions on Medical Imaging, 2013, vol. 32, No. 10, pp. 1890-1900.
R. Korez, B. Ibragimov, B. Likar, F. Pernuš, and T. Vrtovec, "A framework for automated spine and vertebrae interpolation-based detection and model-based segmentation," IEEE Transactions on Medical Imaging, 2015, vol. 34, No. 8, pp. 1649-1662.
S. M. R. Al Arif, K. Knapp, and G. Slabaugh, "Fully automatic cervical vertebrae segmentation framework for X-ray images," Computer methods programs in biomedicine, 2018, vol. 157, pp. 95-111.
R. Janssens, G. Zeng, and G. Zheng, "Fully automatic segmentation of lumbar vertebrae from CT images using cascaded 3D fully convolutional networks," in 2018 IEEE 15th International Symposium on Biomedical Imaging (ISBI 2018), 2018, pp. 893-897.
J.T. Lu et al., "Deepspine: Automated lumbar vertebral segmentation, disc-level designation, and spinal stenosis grading using deep learning," arXiv preprint arXiv, 2018, 10215.
A. Krizhevsky, I. Sutskever, and G. E. Hinton, "Imagenet classification with deep convolutional neural networks," in Advances in neural information processing systems, 2012, pp. 1097-1105.
M. Foracchia, E. Grisan, and A. Ruggeri, "Luminosity and contrast normalization in retinal images," Medical image analysis, 2005. vol. 9, No. 3, pp. 179-190.
R. Liu et al., "An intriguing failing of convolutional neural networks and the coordconv solution," in Advances in Neural Information Processing Systems, 2018, pp. 9605-9616.R. Liu et al., "An intriguing failing of convolutional neural networks and the coordconv solution," in Advances in Neural Information Processing Systems, 2018, pp. 9605-9616.

* cited by examiner

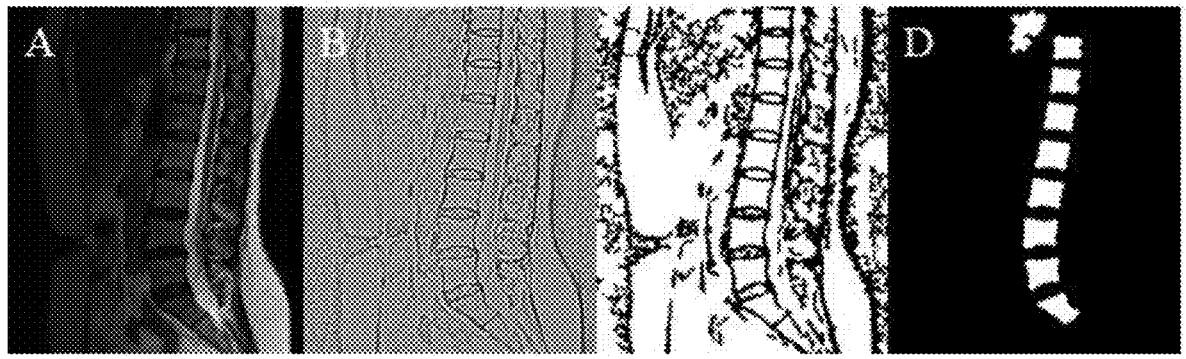
FIG. 16A  FIG. 16B  FIG. 16C  FIG. 16D
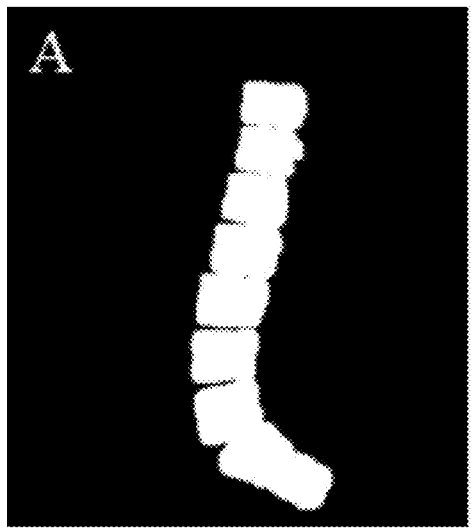 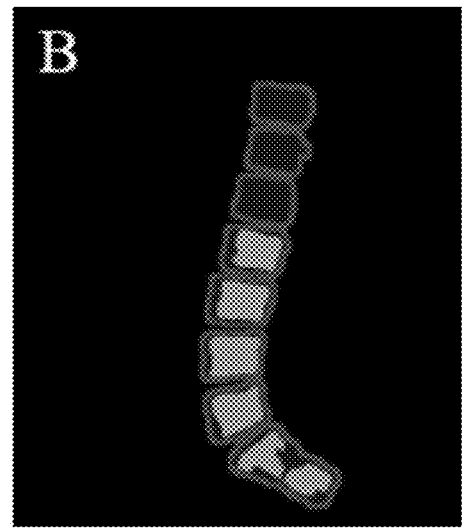
FIG. 17A  FIG. 17B FIG. 18A
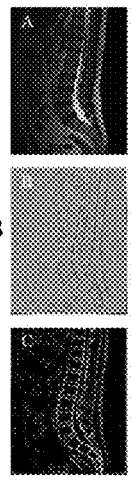
FIG. 18B
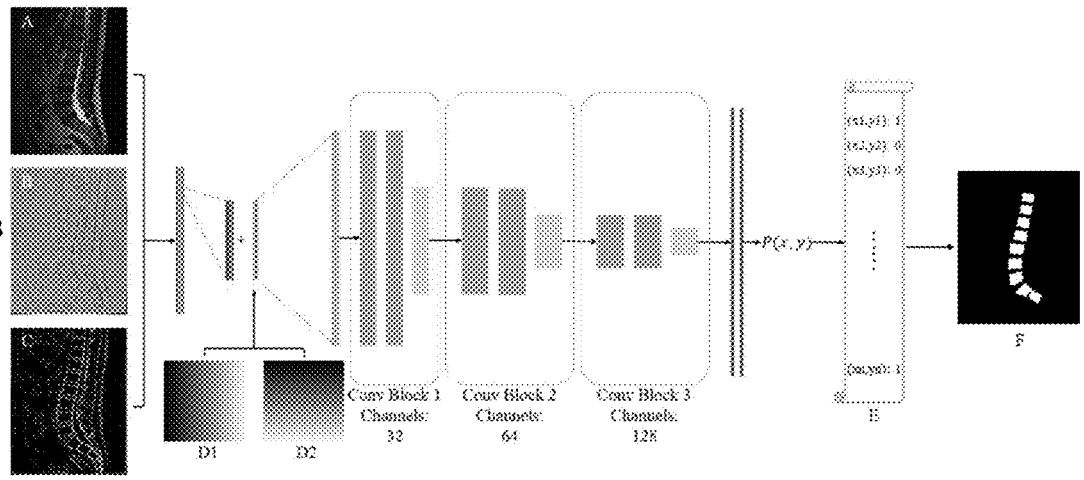
FIG. 18C   FIG. 18D   FIG. 18E   FIG. 18F   FIG. 18G
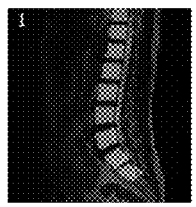 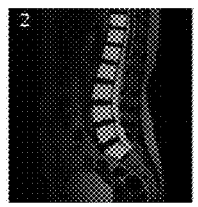 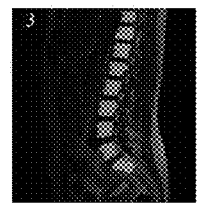 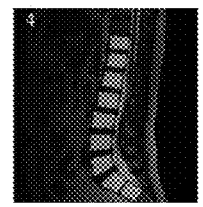 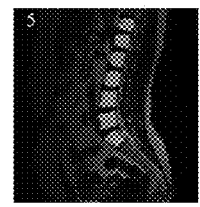
FIG. 19A
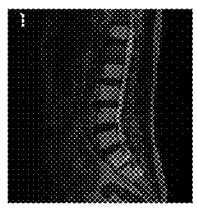 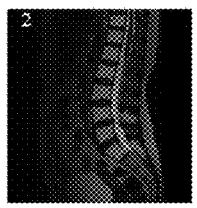 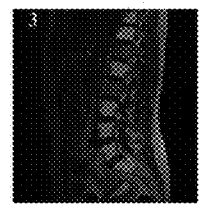 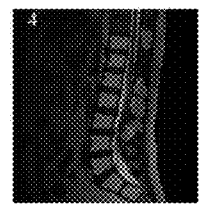 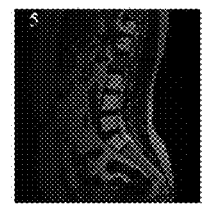
FIG. 19B

LUMBAR SPINE ANATOMICAL ANNOTATION BASED ON MAGNETIC RESONANCE IMAGES USING ARTIFICIAL INTELLIGENCE

CROSS REFERENCE TO RELATED APPLICATION

The present application claims the benefit of priority to U.S. patent application Ser. No. 63/217,157, filed Jun. 30, 2021, which is hereby incorporated by reference in its entirety.

TECHNICAL FIELD

The present invention relates to a system and device for lumbar spine anatomical annotation, pathology detection and progression prediction based on magnetic resonance images using artificial intelligence.

BACKGROUND

Low back pain (LBP) is a common health problem worldwide, with a lifetime incidence of 80%. LBP is associated with reduced quality of life, work disability, potential psychological distress, and increased health-care costs. Chronic LBP may affect 1 to 1.4 billion individuals worldwide, which causes an enormous global socioeconomic burden.

Magnetic resonance images (MRIs) of the lumbar spine are widely used in the orthopedic clinic for the diagnosis of LBP. MRIs can illustrate the 3D structures and potential pathologies of multiple soft tissues in the lumbar spine, including intervertebral discs, the spinal canal, etc. Thus, the lumbar MRI is the gold standard for the assessment of LBP.

Currently, the clinical assessment of lumbar MRIs relies heavily on the experience and subjective judgment of radiologists and spine specialists. Due to the high complexity of the assessment process, the manual assessment of lumbar MRI usually takes a relatively long time, which reduces the efficiency of clinical diagnosis. Besides, due to the subjective factor of manual assessment, the interrater variations are inevitable, which may make the clinical diagnostic results inconsistent and influence the success rate of treatment. Moreover, due to the limitation of human visual patterns, it is difficult for human specialists to utilize some non-perceptible image features within the MRI and to perform some quantitative and mathematical analysis.

Therefore, a fully automated and objective lumbar MRI assessment system, which can perform the quantitative assessment on the MRI, is highly desired to improve the efficiency and consistency of clinical diagnosis and provide an important reference for treatment planning and disease management.

SUMMARY OF THE INVENTION

In order to address the problems involved in diagnosing LBP based on MRI, the present invention utilizes a novel artificial intelligence (AI) system and device for fully automated comprehensive assessment of clinical lumbar magnetic resonance images (MRIs). More specifically, the AI system and device perform AI deep learning based MRI assessment operations on the clinical lumbar MRIs and generate the MRI assessment results including multi-tissue anatomical annotation, multi-pathology detection, and multi-pathology progression prediction.

According to the invention the clinical lumbar MRIs from multiple sources are converted into a standard form, and three MRI assessment operations, including semantic segmentation, pathology detection, and pathology progression prediction, are applied to the standardized lumbar MRIs. For each MRI assessment operation, a novel MRI assessment module is developed, which is equipped with a novel AI deep learning assessment pipeline powered by a parallel computing processer. The AI system and device significantly improve the efficiency and consistency of clinical diagnosis for better treatment planning and disease management, which also have multiple deployment schemes for the application scenarios with different scales.

The multi-tissue anatomical annotation contains pixel-level segmentation masks for multiple spinal tissues, including vertebra, intervertebral disc, nerve, blood vessel, and muscle, which indicate not only the location and rough area, but also the pixel-level shape details of the corresponding tissues in the lumbar MRI. The multi-tissue anatomical annotation has great significance in the 3D reconstruction of multiple spinal tissues for biomechanical simulations and 3D printing. Besides, the multi-tissue anatomical annotation may also facilitate clinical decision making, surgical planning and tissue engineering. Moreover, the multi-tissue anatomical annotation is also used in the AI system and device to provide anatomical information for further pathology detection and progression prediction.

The multi-pathology detection contains the classification and grading of multiple pathologies associated with LBP, including Schneiderman score, disc bulging, Pfirrmann grading, Schmorl's nodes, Marrow changes, etc. For some pathologies, which have only two statuses, positive and negative, the pathology detection is the binary classification of the corresponding pathologies. For some pathologies, which have more than two statuses, the pathology detection is the multi-class classification/grading of the corresponding pathologies. The multi-pathology detection may help clinicians improve the efficiency and accuracy of diagnosis.

The multi-pathology progression prediction contains the prediction of multiple pathologies associated with LBP regarding whether the exiting pathologies will worsen, or new pathologies will emerge in the future. The multi-pathology progression prediction has great significance for better treatment planning and disease management.

The AI system and device contain three major functional components, including: (1) the MRI standardization component, which converts the MRI data from clinical lumbar MRI files with different file formats to a standardized and structured form; (2) the core assessment component, which applies several AI deep learning based MRI assessment operations to the standardized and structured MRI data and generates the MRI assessment results (multi-tissue anatomical annotation, multi-pathology detection, and multi-pathology progression prediction); and (3) the model optimization component, which archives the clinical MRI data based on the specialist's comments and optimizes the AI deep learning models of the core assessment component with the archived data.

The MRI standardization component is adopted to read the MRI data from raw lumbar MRI files, standardize the MRI data, and organize the standardized MRI data to a structured MRI data package. The raw lumbar MRI files from different MRI sources usually have different file formats, which save the MRI data with different protocols and rules. The MRI standardization component utilizes multiple MRI file reading units to read the clinical MRI files with the most of common file formats, which enables the AI system and device to be compatible with most of the common MRI sources.

The raw lumbar MRI file usually saves different kinds of MRI data, including the MRI image data and MRI metadata. The MRI metadata contains multiple items of descriptive information about the attributes of the MRI file. The MRI data from different MRI files may be saved in different forms (different shape, value range, unit, etc.), which are standardized by the MRI standardization component into a standard form. The standardized MRI data is further organized into a structured MRI data package by the MRI standardization component. The structured MRI data package adopts a hierarchical tree structure to organize and save different kinds of MRI data. **

The core assessment component is adopted to automatically generate the MRI assessment results based on the structured MRI data package. The core assessment component contains a semantic segmentation module to generate multi-tissue anatomical annotation, a pathology detection module to generate multi-pathology detection, and a pathology progression prediction module to generate multi-pathology progression prediction.

The semantic segmentation module is equipped with an original anatomical knowledge driven pipeline, which integrates the anatomical a priori knowledge and state-of-the-art AI deep learning technology to generate pixel-level segmentation masks for multiple spinal tissues in lumbar MRI. The AI deep learning model of the semantic segmentation module can be automatically finetuned for each MRI case without relying on any human intervention and manually labelling work. *

The semantic segmentation module consists of three major parts: 1) suboptimal region of interest (ROI) detection, 2) voting based automated supervision generation, and 3) AI deep learning based accurate segmentation. The suboptimal ROIs of multiple spinal tissues are identified first from the lumbar MRI with an original knowledge-based method, which utilizes the anatomical characteristics of spinal tissues. Further, the suboptimal ROIs are processed by a unique voting operation, which automatically generates high-quality supervision for fine-tuning the AI deep learning model. With the voting operation, the pipeline avoids the time-consuming and expensive manual annotation process, which significantly reduces the cost of model fine-tuning. Further, a pretrained AI deep learning model, which has learned the general MRI features and patterns of different spinal tissues, is fine-tuned for each specific MRI case by the automatically generated supervision. Further, the fine-tuned AI deep learning model generates pixel-level semantic segmentation masks for multiple spinal tissues, which serve as the multi-tissue anatomical annotation.

The pathology detection module is equipped with a AI deep learning based pipeline, which contains a AI deep learning model to generate the classification/grading results for multiple pathologies associated with LBP. The multi-tissue anatomical annotation is adopted in the pathology classifying/grading process to provide anatomical information.

The pathology detection module consists of two major parts: 1) intervertebral disc region (IVD region) extraction, and 2) AI deep learning based pathology detection. The IVD regions are determined and extracted from the lumbar MRI based on the multi-tissue anatomical annotation. Each IVD region is a 3D cuboid area containing a whole intervertebral disc, adjacent upper and lower vertebral endplates, and the nearby spinal canal. The IVD region covers most of the area where pathologies associated with LBP may occur. Different IVD regions may have different shapes and sizes, and they are resized to a standard size before being assessed by a AI deep learning model. Further, the IVD region is input to a AI deep learning model that will determine which pathologies are present in the input IVD region, and for some pathologies, the AI deep learning model will further determine the specific grades.

The pathology progression prediction module has a similar AI deep learning based assessment pipeline to that of the pathology detection module, except that the specific task of the AI deep learning model changes from classifying/grading the present pathology to predicting a future pathology. The IVD region is extracted from lumbar MRI and resized in the same way as in the pathology detection module. Further, the IVD region is input to a AI deep learning model, which will provide the prediction of the future status of multiple pathologies associated with LBP. Referring to the multi-pathology detection result generated by the pathology detection module, the progression status of each pathology can be determined.

The model optimization component is adapted to archive the clinical MRI data and MRI assessment results based on comments provided by the specialist or clinicians, and to periodically optimize the AI deep learning models of the core assessment component based on the archived MRI data with clinical labels under the control of the control signal.

The MRI data and assessment results of each MRI case are recorded by the model optimization component during the clinical test. In some cases, clinicians may disagree with some automated assessment results provided by AI system and device, such as, believing that the anatomical annotation is not accurate enough, or the AI system and device have misjudged the grading of some pathologies, etc. In such a case these assessment results can be manually corrected based on the specialist's comments. The corrected assessment results served as the clinical labels and they are archived by the model optimization component. In some cases, the clinicians may believe that some of the MRI cases are more important than others, perhaps because these MRI cases are rarer or more representative. Then the clinicians can assign a higher importance score to them based on the specialist's comments on these cases.

Further, the AI deep learning models of the core assessment component are optimized based on the archived MRI data with clinical labels. The AI deep learning optimizing operation adopts the basic strategy of transfer learning. For each optimization, part of the archived MRI data is involved, which consists of all newly archived MRI cases (not being used for optimization) and randomly selected old MRI cases (have been used for optimization). An old MRI case with a higher importance score has a higher probability of being selected. The AI deep learning optimizing operation is triggered by the control signal, which may be generated manually by the administrator or automatically by external timing devices for periodically optimizing.

The hardware of the AI system and device contains the logical computing processor (CPU), parallel computing processer (GPU), random-access memory, and data storage.

The functional components of the AI system and device are driven by the CPU processor and GPU processor. The CPU processor performs multiple logically complex tasks of MRI standardizing, assessing, and archiving processes, as well as AI deep learning optimizing processes. The GPU processor performs the computationally intensive tasks, including the AI deep learning based MRI assessing and training processes for AI deep learning optimization. The CPU processor and GPU processor here refer to a set of devices that perform the same functions, which can be configured in the AI system and device according to the specific demand of computational power in the application scenarios with different scales. For example, in the personal level application, the CPU and GPU processors can be integrated as separate chips on the motherboard, while in the institutional level application, the AI system and device may need to assess the MRI data of a large institution simultaneously, thus the CPU and GPU processors may upgrade to the CPU and GPU servers for increasing demand of computational power.

The AI system and device contains the random-access memory to save the program codes, which instruct the operations of the CPU and GPU processors, the intermediate data generated during the MRI standardization, MRI assessment, and AI deep learning optimization, as well as the AI deep learning models for multiple specific MRI assessment tasks. The specific hardware configuration of the memory of AI system and device can be alternates for different application scenarios. The data storage of the AI system and device is adopted to store the clinical MRI data with labels for AI deep learning optimization, and back-up AI deep learning models. The specific hardware configuration of the data storage of the AI system and device can be alternates for different demand on the data storage capability in the application scenarios with different scales.

Besides, the AI system and device also contains a set of input/output (I/O) interfaces for interacting with other external devices and MRI sources.

BRIEF SUMMARY OF THE DRAWINGS

This patent or application file contains at least one drawing executed in color. Copies of this patent or patent application publication with color drawing(s) will be provided by the Office upon request and payment of the necessary fee.

The foregoing and other objects and advantages of the present invention will become more apparent when considered in connection with the following detailed description and appended drawings in which like designations denote like elements in the various views, and wherein:

FIG. 16A illustrates the rule-based ROI detection on an original image, FIG. 16B is the preprocessed image thereof, FIG. 16C is the edge enhanced and threshold image thereof and FIG. 16D is the region of interest image thereof;

FIG. 17A illustrates the image from the voting process of the present invention for the volume of interest (VOI) and FIG. 17B illustrates the three pixel categories of VOI in one MRI slice: positive pixels (green), ambiguous pixels (blue), and negative pixels (red);

FIG. 18A illustrates the original MRI image in the pipeline of the deep learning-based vertebra segmentation according to the present invention, FIG. 18B and FIG. 18C represent the local normalized image and the edge detection result, respectively, FIG. 18D shows the coordinate channels, FIG. 18E shows input to the network processed by convolution blocks, FIG. 18F shows the output for all pixels in the VOI, which produces FIG. 18G, the vertebral segmentation result; and FIG. 19A illustrates a row of examples 1-5 of vertebral segmentation results produced by the rule-based method and FIG. 19B shows a row of examples 1-5 of vertebral segmentation results produced by the MRI Sequence Flow pipeline.

DETAILED DESCRIPTION

Figure 1:
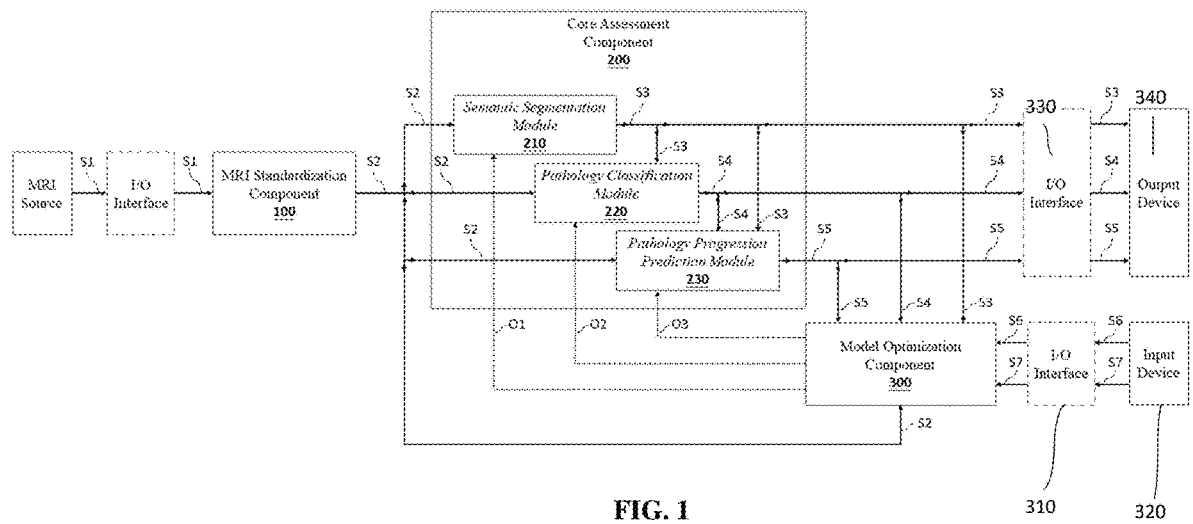
FIG. 1 is a schematic diagram illustrating the overall structure of the AI system for automated lumbar MRI assessment according to the present invention.

FIG. 1 is a diagram illustrating the overall framework of the AI system and device of the present invention. Referring to FIG. 1, the system contains three major functional components, including MRI standardization component (100 of FIG. 1), core assessment component (200 of FIG. 1), and model optimization component (300 of FIG. 1). Each functional component is a combination of hardware and software designed for a specific task.

The MRI standardization component 100 receives the raw MRI files (S1 of FIG. 1), which may have different file formats, and converts the received raw MRI files S1 to structured MRI data packages (S2 of FIG. 1), which are transmitted to the core assessment component 200 and the model optimization component 300 for further automated MRI assessment and AI deep learning optimization.

The MRI standardization component 100 enables the system and device of the present invention to be compatible with different MRI sources, which transmit raw MRI files S1 with different file formats to the system and device through corresponding I/O interfaces. The common MRI sources include the MRI equipment, a compact disc read-only memory (CD-ROM), a universal serial bus (USB) device, a wireless communication system, etc. The common file formats of raw MRI files S1 include DICOM, NIFTI, IMA, TIFF, PNG, JPEG, etc.

The core assessment component 200 receives the structured MRI data packages S2 and generates the automated MRI assessment results, which include the multi-tissue anatomical annotation (S3 of FIG. 1), the multi-pathology detection (S4 of FIG. 1), and the multi-pathology progression prediction (S5 of FIG. 1). The automated MRI assessment results S3, S4, and S5, are transmitted to the output devices 340 through corresponding I/O interfaces 330 and the model optimization component 300 for further AI deep learning optimization. The common output devices 340 include a display, a USB device, a data storage server, a wireless communication system, etc.

The core assessment component 200 contains three major modules, including the semantic segmentation module (210 of FIG. 1), pathology detection module (220 of FIG. 1), and pathology progression prediction module (230 of FIG. 1).

The semantic segmentation module 210 receives the structured MRI data packages S2 and utilizes a AI deep learning model to generate pixel-level segmentation masks for multiple spinal tissues, which are served as multi-tissue anatomical annotation S3. The multi-tissue anatomical annotation S3 indicates not only locations or rough areas but also detailed shape features of corresponding spinal tissues.

The pathology detection module 220 receives the structured MRI data packages S2 and multi-tissue anatomical annotation S3, and utilizes a AI deep learning model to generate the classification and grading results of multiple pathologies associated with LBP, which are output as a multi-pathology detection S4.

The pathology progression prediction module 230 receives the structured MRI data packages S2, multi-tissue anatomical annotation S3, and multi-pathology detection S4, and utilizes a AI deep learning model to generate the multi-pathology progression prediction S5.

The AI deep learning models of the semantic segmentation module 210, pathology detection module 220, and pathology progression prediction module 230, have different architectures and are trained for different specific tasks. The AI deep learning models are optimized via corresponding AI deep learning optimizing operations (O1, O2, and O3 of FIG. 1), which are performed by the model optimization component 300.

The model optimization component 300 receives the structured MRI data packages S2, the automated MRI assessment results (multi-tissue anatomical annotation S3, multi-pathology detection S4, and multi-pathology progression prediction S5), the specialist's comment (S6 of FIG. 1), and the control signal (S7 of FIG. 1) and optimizes the AI deep learning models of three major modules (semantic segmentation module 210, pathology detection module 220, and pathology progression prediction module 230) of the core assessment component 200

The specialist's comment S6 is input by clinicians though input devices 320 and corresponding I/O interfaces 310. The common input devices 320 include the keyboard, the pointing device, the wireless communication system, etc. The specialist's comment S6 may contain a correction of automated MRI assessment results S3, S4, and S5, when the clinicians disagree with the assessment results generated by the AI system and device, and the importance score of each MRI case, which represents the importance and significance of a corresponding MRI case. The model optimization component 300 will correct the automated MRI assessment results S3, S4, and S5, based on the specialist's comment S6 and archive the MRI data S2, S3, S4, and S5. The AI deep learning optimizing operations O1, O2, and O3, are performed based on the archived MRI data S2, S3, S4, and S5.

The input control signal S7 triggers the AI deep learning optimizing operations O1, O2, and O3, and may be generated manually by the administrator or automatically by external timing devices for periodically optimizing.

MRI Standardization Component and Structured MRI Data Package

Figure 2:
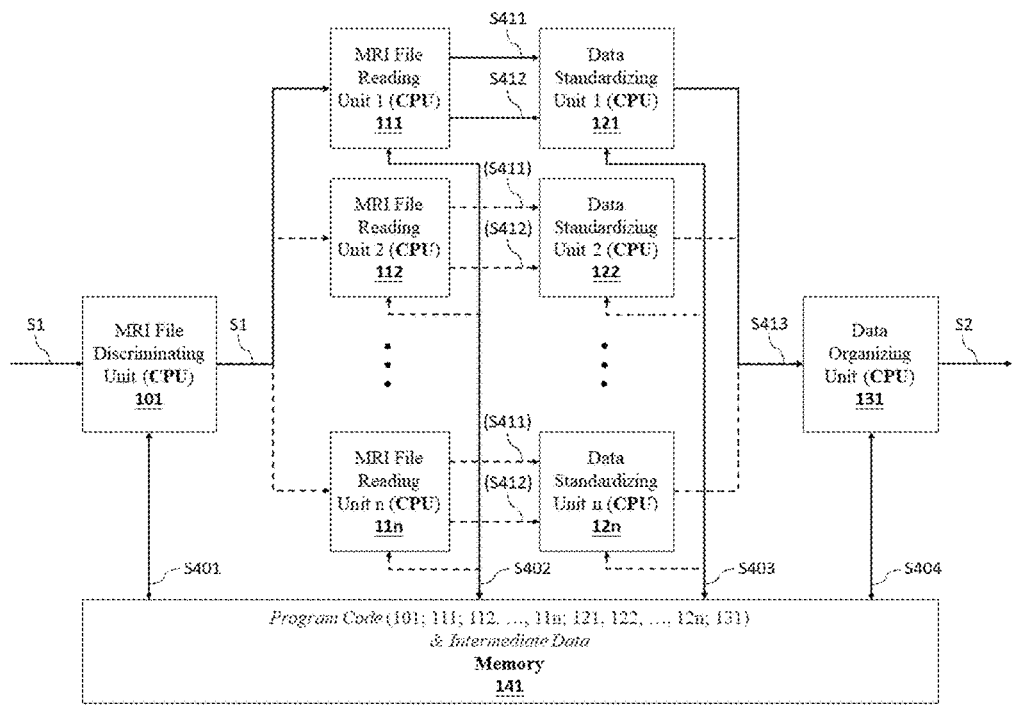
FIG. 2 is a schematic diagram illustrating the MRI standardization component of the AI system of the present invention.

FIG. 2 is a diagram illustrating the MRI standardization component 100 of the present invention. The MRI standardization component is adapted to use an AI system to convert raw MRI files (S1 of FIG. 2) with different file formats into the structured MRI data packages (S2 of FIG. 2). Referring to FIG. 2, the MRI standardization component contains an MRI file discriminating unit (101 of FIG. 2), a set of MRI file reading units (111, 112, ..., 11n of FIG. 2), a set of data standardizing units (121, 122, ..., 12n of FIG. 2), a data organizing unit (131 of FIG. 2), and a memory (141 of FIG. 2).

The MRI file discriminating unit 101 receives the raw MRI files S1 and transmits each received raw MRI file S1 to the corresponding MRI file reading unit 111/112/ ... /11n, based on the file format. The MRI file discriminating unit 101 discriminates the file formats of raw MRI files S1 based on the filename suffixes. Raw MRI files S1 with different file formats usually have different corresponding filename suffixes. For example, the DICOM file usually has the filename suffix of '.dicom' or '.dcm', the NIFTI file usually has the filename suffix of '.nii', and the TIFF file usually has the filename suffix of '.tiff' or '.tif'.

The MRI file reading units 111, 112, ... 11n, receive the raw MRI files S1 and read the MRI image data (S411 of FIG. 2) and MRI metadata (S412 of FIG. 2) from the received raw MRI files S1, which are transmitted to the corresponding data standardizing unit 121/122/ ... /12n. The MRI metadata S412 usually contains different kinds of descriptive information about the MRI case, including the pixel size which represents the actual size of each pixel in the MRI image, the slice thickness which represents the distance between two adjacent MRI slices, the MRI acquisition date, the subject ID, etc. The raw MRI files S1 with different file formats usually save the MRI data S411 and S412 with different protocols and rules, which makes each file format readable for only one or a few specific reading units. A set of different MRI file reading units 111, 112, ... 11n, are adapted in the MRI standardization component to read the raw MRI files S1 with all commonly used file formats. The MRI file discriminating unit 101 selects one from the set of MRI file reading units 111, 112, ... 11n, to read the MRI data S411 and S412 from received raw MRI file S1, based on the file format (in FIG. 2, the 111 is selected).

The data standardizing units 121, 122, ..., 12n, receive the MRI image data S411 and MRI metadata S412, and convert the received MRI data S411 and S412 to the standardized MRI data (S413 of FIG. 2), which are transmitted to the data organizing unit 131. The MRI data S411 and S412 from different raw MRI files S1 may be saved in different forms. For example, in some cases the MRI image data S411 is saved as a series of 2D arrays, each of which represents a MRI slice, and in other cases the MRI image data S411 is saved as a 3D array directly.

Further, the pixel value range of the MRI image may also be different in different raw MRI files S1. Moreover, the MRI metadata S411, such as pixel size, slice thickness, etc., may be saved with different units. A set of different data standardizing units 121, 122, . . . , 12n, are adapted in the MRI standardization component to convert the MRI data S411 and S412 of different raw MRI files S1 to a standardized form, which will be described in detail below referring to FIG. 3. Since each data standardizing unit is connected to only one MRI file reading unit, for each raw MRI file S1, only one data standardizing unit 121/122/ . . . /12n will be used to standardize the MRI data. In FIG. 2, the Data Standardizing Unit 121 is used.

The data organizing unit 131 receives the standardized MRI data S413, and organizes the standardized MRI data S413 into a structured MRI data package S2, which is the final output of the MRI standardization component. The data organizing unit 131 organizes different kinds of data based on a predefined hierarchical tree structure, which will be described in detail below referring to FIG. 3.

The MRI file discriminating unit 101, MRI file reading units 111, 112, . . . , 11n, data standardizing units 121, 122, . . . , 12n, and data organizing unit 131 of the MRI standardization component are driven by a CPU processor (not shown), which performs all algebraic operations, logical operations, control tasks, and communication tasks in the MRI file discriminating and reading, as well as MRI data standardizing and organizing process. All units in the MRI standardization component mentioned above perform the high-intensity data interaction (S401, S402, S403, and S404 of FIG. 2) with the memory 141, which saves the program codes instructing the CPU operations and also saves the intermediate data during the processing. The program codes can be written with multiple programming languages including C, C++, Java, Python, etc.

Figure 3:
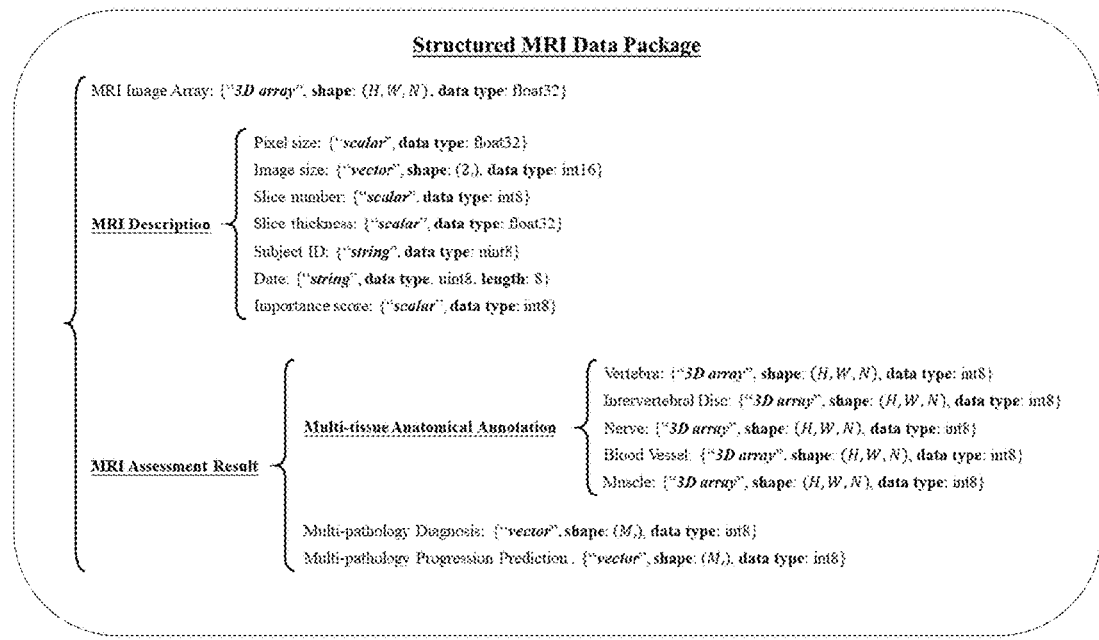
FIG. 3 is a diagram illustrating the structure and content of structured MRI data packages according to the present invention.

FIG. 3 is a diagram illustrating the structure and content of the structured MRI data package generated by the MRI standardization component of the present invention. The structured MRI data package adopts a hierarchical tree structure to organize different kinds of standardized data associated with the MRI case. Each structured MRI data package contains two kinds of programming objects, namely items and groups. The item represents a data element, which may be a scalar, vector, array, or character string. The group is a container, which may contain several items or other groups.

Referring to FIG. 3 the structured MRI data package contains the MRI image array (item), MRI description (group), and MRI assessment result (group). The MRI image array is the standardized MRI image data from the raw MRI file, which is a 3D array with the shape of (H,W,N), where H, W represent the height and width of each MRI slice, and N is the slice number of the MRI sequence. The pixel value range of the MRI image array is normalized to [0,1). The data type of the MRI image array is float32.

The MRI description contains the standardized MRI metadata including the pixel size (item), image size (item), slice number (item), slice thickness (item), subject ID (item), date (item), and importance score (item). The pixel size and slice thickness are scalars with the data type of float32, and in the unit of millimeter (mm). The slice number is a scalar with the data type of int8. The image size is a vector with the shape of (2,) and the data type of int16. The first and second elements of image size represent the height and width of each MRI slice. The subject ID and date are both character strings with the data type of uint8, and the date has the fixed length of 8 representing the year-month-date. The importance score is a scalar with the data type of int8, which can be one of {1,2,3,4,5}. The higher importance score, the more important the corresponding MRI case is.

The MRI assessment result contains the multi-tissue anatomical annotation (group), multi-pathology detection (item), and multi-pathology progression prediction (item). The multi-tissue anatomical annotation contains the pixel-level segmentation masks (item) of vertebra, intervertebral disc, nerve, blood vessel, and muscle. Each pixel-level segmentation mask is a 3D array with the same shape as the MRI image array and has the data type int8. The multi-pathology detection and multi-pathology progression prediction are vectors with the shape of (M,) and data type of int8, where M represents the number of pathologies to be assessed.

The importance score of the MRI description and MRI assessment result are not determined when the structured MRI data package is generated by the MRI standardization component, and 0 is used to fill in all undetermined items, which will be edited with determined values latter.

The structured MRI data package is the major form of MRI data in the communication, processing, and storage of the AI system of the present invention. All functional components and modules of the system can read and edit the structured MRI data package. The structured MRI data package can be implemented with multiple existing structured data formats, such as JavaScript Object Notation (JSON), Hierarchical Data Format (HDF), etc.

Assessment: Multi-Tissue Anatomical Annotation

Figure 4:
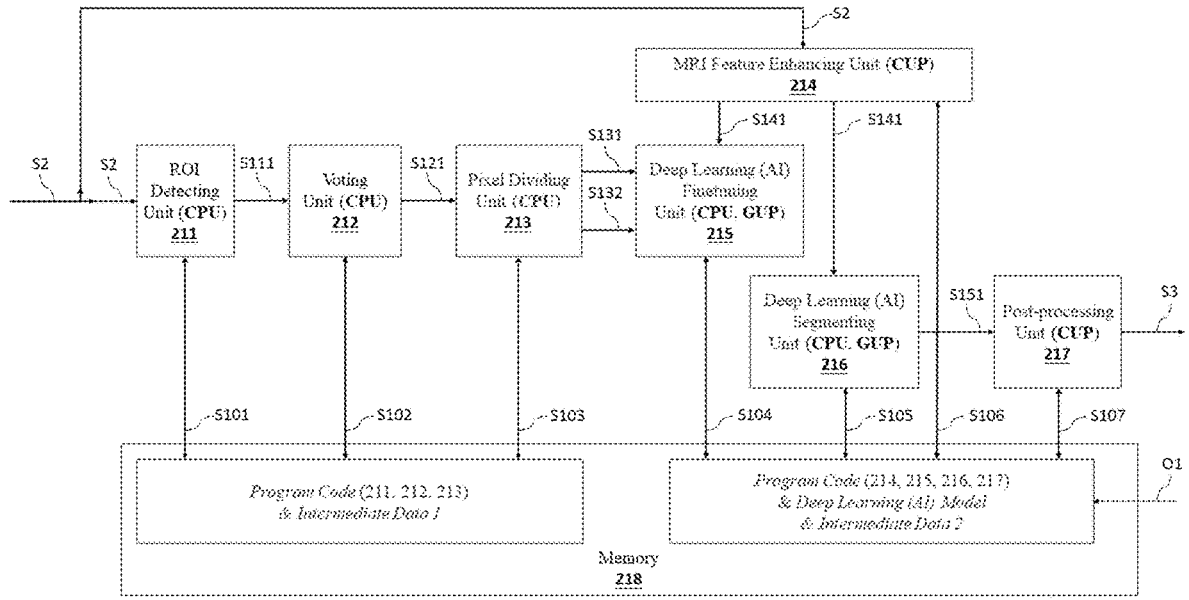
FIG. 4 is a diagram illustrating the semantic segmentation module of the core assessment component according to the present invention.

FIG. 4 is a diagram illustrating the semantic segmentation module 210 of the core assessment component 200, which generates the multi-tissue anatomical annotation (S3 of FIG. 4) based on the structured MRI data package (S2 of FIG. 4). The multi-tissue anatomical annotation S3 consists of the pixel-level segmentation masks of multiple spinal tissues including vertebra, intervertebral disc, nerve, blood vessel, and muscle. Referring to FIG. 4, the semantic segmentation module contains a ROI detecting unit (211 of FIG. 4), a voting unit (212 of FIG. 4), a pixel dividing unit (213 of FIG. 4), an MRI feature enhancing unit (214 of FIG. 4), a AI deep learning fine-tuning unit (215 of FIG. 4), a AI deep learning segmenting unit (216 of FIG. 4), a post-processing unit (217 of FIG. 4), and a memory (218 of FIG. 4).

The ROI detecting unit 211 receives the structured MRI data package S2 and generates the suboptimal regions of interest (ROIs) (S111 of FIG. 4) of multiple spinal tissues, which are transmitted to the voting unit 212. The suboptimal ROI S111 of each spinal tissue is a 3D array with the same shape of the MRI image array. The ROI detecting unit 211 applies a set of knowledge-based image processing operations on the MRI image array. The knowledge-based image processing operations are designed based on the anatomical a priori knowledge (such as relative positions, average sizes, shapes, etc.) about the corresponding tissues, and configurated based on the MRI description, which will be described in detail below referring to FIG. 5.

The suboptimal ROI S111 may contain mistakes, including missing objects, false positive, shape distortion, etc., which may be caused by the underlying pathologies and/or inconsistent image quality (including shape distortion, low pixel intensity, low contrast, unclear edges, and noise). The mistakes are acceptable in the suboptimal ROI S111 and will not affect the final assessment result.

The voting unit 212 receives the suboptimal ROIs S111 of multiple spinal tissues and generates the confidence coefficient maps (S121 of FIG. 4) of the corresponding spinal tissues, which are transmitted to the pixel dividing unit 213.

The confidence coefficient map S121 of each spinal tissue is a 3D array with the same shape of MRI image array, and indicates the probabilities that pixels in the MRI image array may belong to the corresponding spinal tissue. The confidence coefficient map S121 of each spinal tissue is calculated by applying a unique voting operation on the corresponding suboptimal ROI S111. The voting operation is based on an anatomical a priori knowledge, which is that each spinal tissue has a relatively fixed position and no drastic shape variation in adjacent MRI slices. The voting operation will be described in detail below referring to FIG. 6.

The pixel dividing unit 213 receives the confidence coefficient maps S121 of multiple spinal tissues and divides the pixels in the MRI image array into three categories, including the positive pixels (S131 of FIG. 4) of each corresponding spinal tissue, the negative pixels (S132 of FIG. 4), and the ambiguous pixels. Only the positive pixels S131 and negative pixels S132 are transmitted to the AI deep learning fine-tuning unit 215.

The positive pixels S131 of each spinal tissue represents pixels in the MRI image array that most likely belong to the corresponding spinal tissue. The negative pixels S132 represent pixels in MRI image array that most likely do not belong to any spinal tissues. Pixels in MRI image array that do not belong to either positive pixels or negative pixels are defined as ambiguous pixels, which cover most of the mistakes in the suboptimal ROI, and are not transmitted to the AI deep learning fine-tuning unit 215.

The positive pixels S131 of each spinal tissue and negative pixels S132 are represented as the 3D array with the same shape as the MRI image array. The pixel dividing unit 213 applies the thresholding and anatomical spatial constraint on the confidence coefficient maps S121 to divide the pixels in MRI image array, which will be described in detail below referring to FIG. 7.

The MRI feature enhancing unit 214 receives the structured MRI data package S2 and generates the enhanced MRI feature arrays (S141 of FIG. 4), which are transmitted to the AI deep learning fine-tuning unit 215 and AI deep learning segmenting unit 216. The MRI feature enhancing unit 214 applies two different image feature enhancement operations to the MRI image array of the structured MRI data package S2, including pixel value local normalization and edge enhancement. The pixel value local normalization eliminates the variation of pixel value in different spinal tissues and enhances the texture features of MRI, which are calculated as:

$$LocN(x, y, z) = \frac{(2n + 1)^2 \times I(x, y, z)}{\sum_{i=-n}^{n} \sum_{j=-n}^{n} \sum_{k=-n}^{n} I(x + i, y + j, z + k)},$$

where I(x,y,z) denotes the pixel value of the MRI image array, 2n+1 is the scale of a 3D local neighbourhood, and the LocN(x,y,z) represents the result of pixel value local normalization. The edge enhancement detects and enhances the edge between different spinal tissues using Sobel edge detectors, which are two orthogonal convolution kernels for detecting the gradient of pixel value in different directions. The original MRI image array, together with the pixel value local normalization and edge enhancement results, are served as the enhanced MRI feature arrays S141, which is a 4D array with the shape of (H, W, N, 3), where 3 represents the 3 feature channels.

The AI deep learning fine-tuning unit 215 receives the enhanced MRI feature arrays S141, the positive pixels S131 of each spinal tissue, and the negative pixels S132, and fine-tunes the AI deep learning model saved in memory 218. The AI deep learning model is developed to generate the pixel-level segmentation masks of multiple spinal tissues based on the enhanced MRI feature arrays S141. The AI deep learning model has learned the general MRI image features and patterns of different spinal tissues though a pretraining process. The AI deep learning fine-tuning unit 215 fine-tunes the AI deep learning model to adapt to the variation of image features and patterns in different MRI cases, which may be caused by the underlying pathologies and/or inconsistent image quality. The AI deep learning fine-tuning process is a standard transfer learning process. The pretrained AI deep learning model is further trained with the supervision provided by positive pixels S131 (provided by the label of the pixels in each spinal tissue) and negative pixels S132 (provided by the label of the pixels in the background). Since the positive pixels S131 and negative pixels S132 are generated with the fully automated operations including ROI detection, voting, and pixel dividing, the AI deep learning model can be fine-tuned for each MRI case without requiring any manual annotation or human intervention.

The AI deep learning segmenting unit 216 receives the enhanced MRI feature arrays S141 and generates the soft segmentation result (S151 of FIG. 4) for multiple spinal tissues, which is transmitted to the post-processing unit 217. The soft segmentation result S151 is a 4D array with the shape of (H, W, N, 5+1), where the last dimension 5+1 represents the probabilities that pixels in the MRI image array belong to vertebra, intervertebral disc, nerve, blood vessel, muscle, and background.

The AI deep learning segmenting unit 216 utilizes the AI deep learning model fine-tuned by the AI deep learning fine-tuning unit 215, to analysis the enhanced MRI feature array S141. The AI deep learning model generates the soft segmentation result S151 based on the local MRI features and pattern of each pixel in the MRI image array. Since the fine-tuned AI deep learning model adapts to the variation of image features and patterns in different MRI cases, the soft segmentation result S151 is much more accurate and robust than the confidence coefficient maps S121.

The post-processing unit 217 receives the soft segmentation result S151 and generates the multi-tissue anatomical annotation S3, which is the final output of the semantic segmentation module 210 of the core assessment component 200. The post-processing unit 217 splits the soft segmentation result S151 into six 3D arrays with the shape of (H, W, N) according to the last dimension, which are the probability arrays of corresponding spinal tissues and background. Then the post-processing unit 217 applies thresholds on each probability array with the threshold value of 0.5, which converts the probability arrays to the binary masks. Finally, the post-processing unit 217 applies the morphology operations, including opening operation and closing operation, on binary masks to remove the small noise points. The denoised binary masks are the pixel-level segmentation masks of multiple spinal tissues, which are served as the multi-tissue anatomical annotation S3.

The ROI detecting unit 211, voting unit 212, pixel dividing unit 213, MRI feature enhancing unit 214 and post-processing unit 217 are driven by or are modules of the CPU processor, which performs the algebraic operations, logic operations, control tasks, and communication tasks in the ROI detecting, voting, pixel dividing, MRI feature enhancing and post-processing process. Vectoral computation is adopted, which significantly accelerates the CPU operations through single instruction, multiple data (SIMD) strategy.

The AI deep learning fine-tuning unit 215 and AI deep learning segmenting unit 216 are driven by the CPU and a graphic processing unit (GPU) processor. The CPU performs the control tasks, communication tasks, and a very few logic operations in the AI deep learning fine-tuning and segmenting process. The GPU performs the major computational tasks in the AI deep learning fine-tuning and segmenting process, which requires intensive algebraic operations.

All units of the semantic segmentation module mentioned above perform the high-intensity data interaction (S101, S102, S103, S104, S105, S106 and S107 of FIG. 4) with the memory 218, which saves the program codes instructing the CPU and GPU operations and the intermediate data during the processing. The program codes can be written with multiple programming languages including C, C++, Java, Python, etc. Further, the memory 218 also saves the AI deep learning model for the segmentation of multiple spinal tissues. For the assessment of each MRI case, the AI deep learning fine-tuning unit 215 first loads the pretrained AI deep learning model from the memory 218, and then fine-tunes the pretrained AI deep learning model to adapt to the specific MRI case. The fine-tuned AI deep learning model is transmitted back to the memory 218 and loaded by the AI deep learning segmenting unit 216 for the segmentation task. The AI deep learning model can be developed with multiple existing frameworks including Convolutional Architecture for Fast Feature Embedding (CAFFE), Tensor-Flow, PyTorch, etc., and is periodically updated with a AI deep learning optimizing operation O1.

Figure 5:
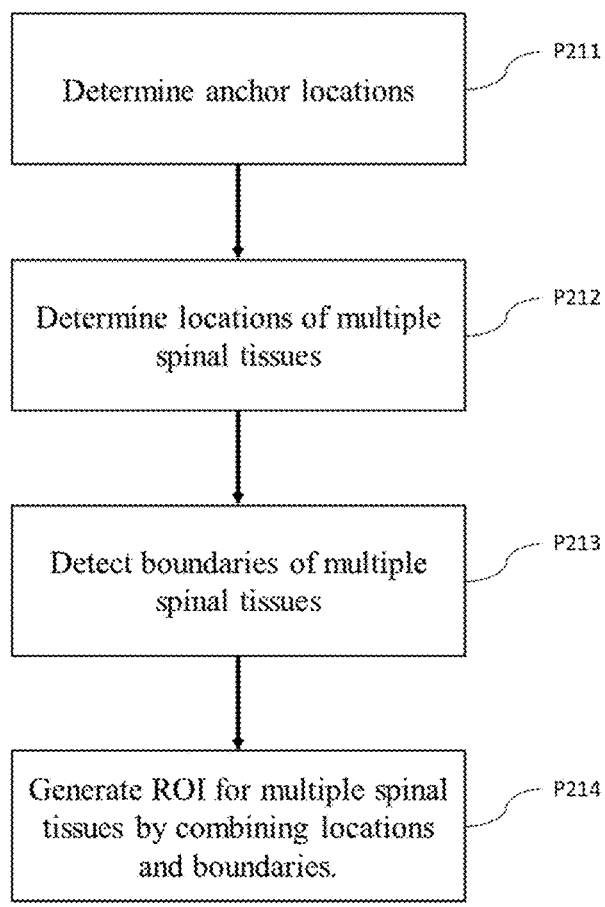
FIG. 5 is a flowchart of the suboptimal region of interest (ROI) detection process of the semantic segmentation module of the present invention.

FIG. 5 is a flowchart illustrating the knowledge-based suboptimal ROI detecting process. Referring to FIG. 5, the anchor locations are determined first in the MRI image array (P211 of FIG. 5). The anchor locations should be obvious in the MRI and have anatomical meaning. For example, in the sagittal T2 lumbar MRI, the upper and lower endplates of vertebral bodies are clearly displayed in mid-sagittal MRI slice, and can be distinguished and located using the Sobel edge detector. Therefore, the locations of vertebral body endplates can serve as anchor locations.

Further, the locations of multiple spinal tissues are determined (P212 of FIG. 5) based on the anchor locations and the anatomical a priori knowledge about relative locations between spinal structures, such as, each intervertebral disc is located between a pair of vertebral endplates, each vertebra is located between two adjacent intervertebral discs, etc. Further, the boundaries of multiple spinal tissues are detected in MRI image array (P213 of FIG. 5). There are several existing edge detection operators can be adopted for the boundary detection, including Sobel operator, Prewitt operator, Robert operator, Canny operator, Marr-Hildreth operator, etc.

Further, the suboptimal ROI of each spinal tissue is generated by combining the locations and boundaries of corresponding tissue (P214 of FIG. 5). More specifically, the suboptimal ROI can be generated by iteratively applying the dilation morphology operation from the location points of corresponding spinal tissue with the constraint of boundaries. The iterations and structuring element of the dilation are determined based on the a priori knowledge about the shape and size of each spinal tissue.

The spatial scale information adopted in the suboptimal ROI detection process, including the distance between spinal tissues and the size of each spinal tissue, is provided in pixel (px) units and is determined based on the anatomical prior knowledge and MRI metadata. For example, the height of intervertebral disc in an MRI image array (px) is calculated by the average height of intervertebral disc (mm) divided by the pixel size (mm/px) of the MRI. Thus, for each MRI case the suboptimal ROI detection process will be reconfigured based on the MRI metadata.

Figure 6:
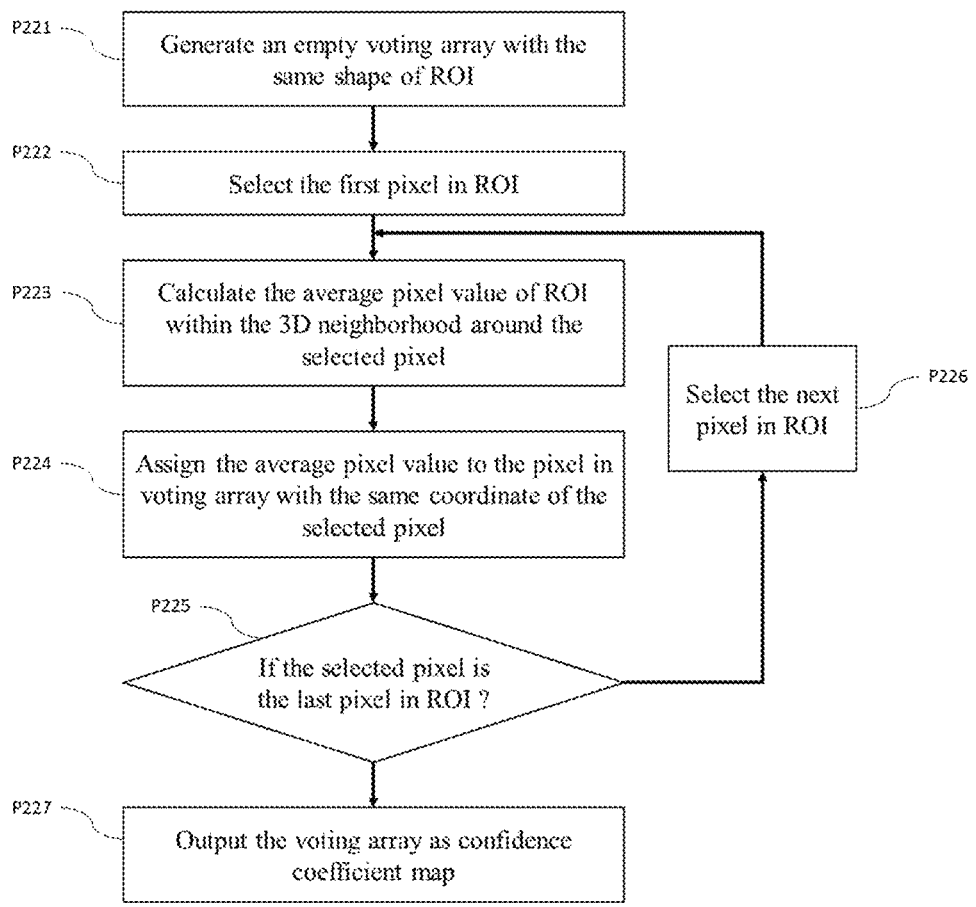
FIG. 6 is flowchart of the voting process of the semantic segmentation module of the present invention.

FIG. 6 is a flowchart illustrating the voting process, which generates the confidence coefficient map of each spinal tissue based on the corresponding suboptimal ROI. Referring to FIG. 6, an empty 3D voting array is generated first, which has the same shape of the suboptimal ROI (P221 of FIG. 6). Further, the first pixel in the suboptimal ROI is selected (P222 of FIG. 6) and the average pixel value of the suboptimal ROI within the 3D neighborhood around the selected pixel is calculated (P223 of FIG. 6). The pixel value of the suboptimal ROI can be 1 or 0. If the pixel is in the tissue (foreground of suboptimal ROI), the pixel value is 1; otherwise, the pixel value is 0. The average pixel value is assigned to the pixel in the voting array (P224 of FIG. 6), which has the same location as the selected pixel in suboptimal ROI.

Further, the next pixel in the suboptimal ROI is selected (P226 of FIG. 6), and the operations of P223 and P224 are applied on the selected pixel. The operations of P223, P224, and P226 are repeated until the last pixel of suboptimal ROI is selected (P225 of FIG. 6) and the average pixel values are assigned to all empty positions of the voting array. The filled voting array is output as the confidence coefficient map of a specific spinal tissue (P227 of FIG. 6). The voting process illustrated in FIG. 6 is performed 5 times by the voting unit of semantic segmentation module for each MRI case in order to generate the confidence coefficient maps of vertebra, intervertebral disc, nerve, blood vessel, and muscle, respectively.

Figure 7:
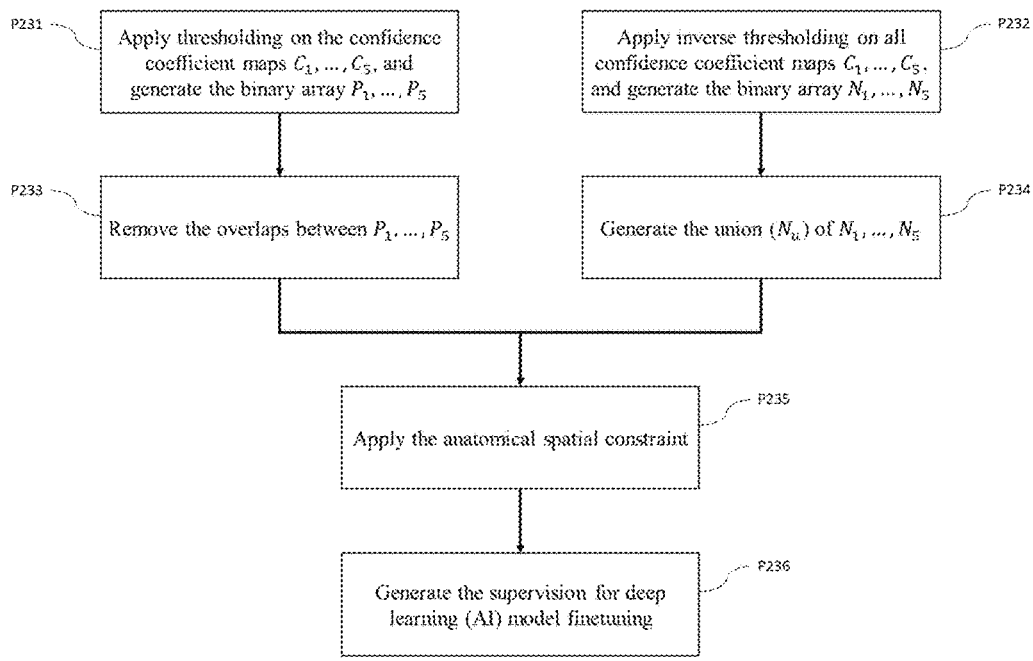
FIG. 7 is flowchart of the pixel division process of the semantic segmentation module of the present invention.

FIG. 7 is a flowchart illustrating the pixel dividing process, which generates the supervision, containing the positive pixels for each spinal tissue and the negative pixels, for AI deep learning fine-tuning. Referring to FIG. 7, the thresholding and inverse thresholding are first applied on the confidence coefficient maps of vertebra ($C_1$), intervertebral disc ($C_2$), nerve ($C_3$), blood vessel ($C_4$), and muscle ($C_5$), respectively (P231, P232 of FIG. 7). The thresholding process P231 is defined as:

$$B(x, y) = \begin{cases} 1, & C(x, y) > T \\ 0, & C(x, y) \le T \end{cases},$$

and the inverse thresholding process P232 is defined as:

$$B(x, y) = \begin{cases} 1, & C(x, y) < T \\ 0, & C(x, y) \ge T \end{cases},$$

where $C(x,y)$ and $B(x,y)$ represent the input confidence coefficient map and the output binary mask, and T is the threshold value. The thresholding process P231 generates the binary arrays $P_1, \ldots, P_5$, which correspond to different confidence coefficient maps, with threshold values $T_{p1}, \ldots, T_{p5}$, and the inverse thresholding process P232 generates the binary arrays $N_1, \ldots, N_5$ with threshold values $T_{n1}, \ldots, T_{n5}$.

For each spinal tissue, the threshold value for thresholding ($T_{pi}$) should be larger than the threshold value for inverse thresholding ($T_{ni}$). Further, the overlaps between $P_1, \ldots, P_5$ are removed (P233 of FIG. 7) to ensure that each pixel will not belong to more than one spinal tissue in the final supervision, and the union of $N_1, \ldots, N_5$ is generated (P234 of FIG. 7), which is denoted as N. Further, the anatomical spatial constraint is applied to the binary arrays $P_1, \ldots, P_5$ and $N_u$ (P235 of FIG. 7). The anatomical a priori knowledge, including the shapes, sizes, and relative locations of each spinal tissue, is adopted to constrain the foreground (pixel with the pixel value of 1) in $P_1, \ldots, P_5$ to remove the noise and potential mistakes. Also, the pixels in the borders of the foregrounds in $P_1, \ldots, P_5$ and $N_u$, which may contain the potential mistakes, are also removed. Further, the supervision for AI deep learning model fine-tuning is generated (P236 of FIG. 7). The processed $P_1, \ldots, P_5$ are served as the positive pixels of each spinal tissue, and the processed $N_u$ serves as negative pixels.

Assessment: Multi-Pathology Detection

Figure 8:
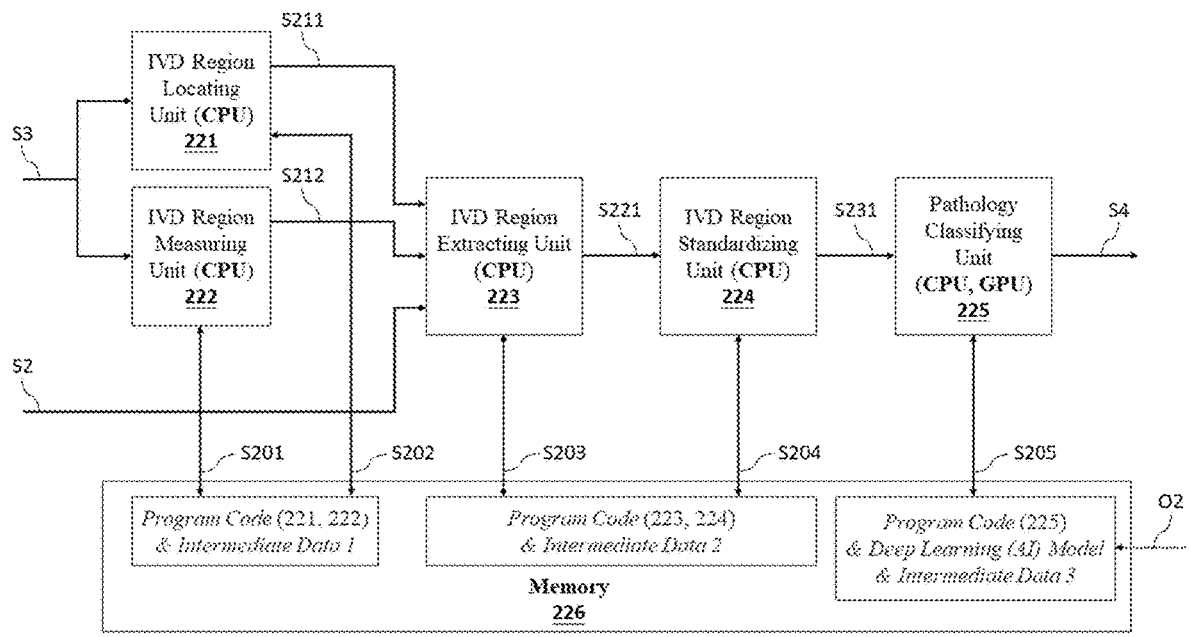
FIG. 8 is schematic diagram of the pathology detection module of the core assessment component of the present invention.

FIG. 8 is a block diagram illustrating the pathology detection module 220 of the core assessment component 200, which is adopted in the present invention to generate the multi-pathology detection (S4 of FIG. 8) based on the structured MRI data package (S2 of FIG. 8) and the multi-tissue anatomical annotation (S3 of FIG. 8). The multi-pathology detection S4 contains the classification and grading of multiple pathologies associated with LBP, including Schneiderman score, disc bulging, Pfirrmann grading, Schmorl's nodes, Marrow changes, etc. Referring to FIG. 8, the pathology detection module contains an intervertebral disc (IVD) region locating unit (221 of FIG. 8), an IVD region measuring unit (222 of FIG. 8), an IVD region extracting unit (223 of FIG. 8), an IVD region standardizing unit (224 of FIG. 8), a pathology detection unit (225 of FIG. 8), and a memory (226 of FIG. 8). The IVD region locating unit 221 and IVD region measuring unit 222 receive the multi-tissue anatomical annotation S3 and determine the position (S211 of FIG. 8) and size (S212 of FIG. 8) of each IVD region respectively, which are transmitted to the IVD region extracting unit 223.

The IVD region of each intervertebral disc is a cuboid region, which centers at and is parallel to the corresponding intervertebral disc. The IVD region locating unit 221 determines the position of each IVD region S211 by identifying the location and rotation of each intervertebral disc based on the multi-tissue anatomical annotation S3. The IVD region has the shape of $(h+0.6\ h_{vb},\ d+2d_{sc},\ n)$ where h and d represent the height and diameter of the corresponding intervertebral disc, $h_{vb}$ is the average height of two adjacent vertebrae bodies, and $d_{sc}$ is the average diameter of the spinal canal within the posterior region of the corresponding intervertebral disc. The IVD region measuring unit 222 determines the size of each IVD region S212 by measuring the dimensions of spinal tissues mentioned above based on the multi-tissue anatomical annotation S3.

The IVD region extracting unit 223 receives the position S211 and size S212 of each IVD region, as well as the structured MRI data package S2, and extracts the 3D IVD region array of each IVD (S221 of FIG. 8) from MRI image array and transmits them to the IVD region standardizing unit 224. Each IVD region array S221 contains the whole corresponding IVD, two adjacent vertebral endplates, and the spinal canal within the posterior region of the IVD. The IVD region array S221 covers most of the areas where the pathologies associated with LBP may occur.

The IVD region standardizing unit 224 receives the 3D IVD region array of each intervertebral disc S221 and converts the received IVD region arrays S221 to standardized IVD region arrays (S231 of FIG. 8), which are transmitted to the pathology detection unit 225. The IVD region arrays S221 extracted by the IVD region extracting unit 223 usually have different sizes, which depend on the actual anatomical dimensions. The IVD region standardizing unit 224 adopts several interpolation technologies, including nearest interpolation, linear interpolation, bilinear interpolation, etc., to convert the sizes of received IVD region arrays S221 to a standard size.

The pathology detection unit 225 receives the standardized IVD region arrays S231 and provides the multi-pathology detection S4, which is the final output of the pathology detection module of the core assessment component 200. The multi-pathology detection S4 includes the classification and grading results for multiple pathologies within each IVD region array.

The pathology detection unit 225 adopts a AI deep learning model for the assessment of pathologies. Some pathologies have only two statuses, positive and negative, such as Schmorl's nodes, Marrow changes, etc., and the AI deep learning model will perform the binary classification on these pathologies. Some pathologies have more than two statuses, such as Schneiderman score, disc bulging, Pfirrmann grading, etc., and the AI deep learning model will perform the multi-class classification/grading on these pathologies.

The IVD region locating unit 221, IVD region measuring unit 222, IVD region extracting unit 223, and IVD region standardizing unit 224 are driven by the CPU processor, which performs all algebraic operations, logical operations, control tasks, and communication tasks in the IVD region locating, measuring, extracting, and standardizing process.

The pathology detection unit 225 is driven by the CPU and the GPU processor. The CPU performs the control, communication, and logic operation tasks. The GPU performs the major computational tasks of AI deep learning based pathology detection process, which requires intensive algebraic operations.

All units of the pathology detection module mentioned above (221, 222, 223, 224, and 225) perform the high-intensity data interaction (S201, S202, S203, S204 and S205 of FIG. 8) with the memory 226. The memory 226 saves the program codes instructing the CPU and GPU operations, the intermediate data during the processing, and the AI deep learning model for the detection of multiple pathologies. The program codes can be written with multiple programming languages including C, C++, Java, Python, etc. The AI deep learning model can be developed with multiple existing frameworks including CAFFE, TensorFlow, PyTorch, etc., and periodically updated with AI deep learning optimizing operation O2.

Assessment: Multi-Pathology Progression Prediction

Figure 9:
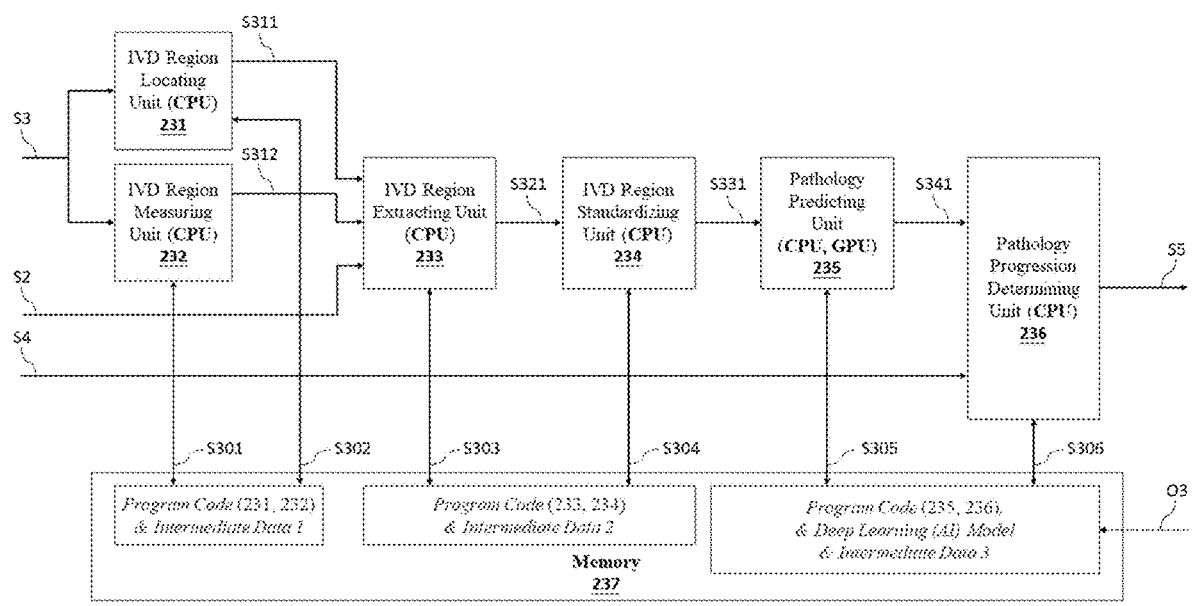
FIG. 9 is a schematic diagram of the pathology progression prediction module of the core assessment component of the present invention.

FIG. 9 is a diagram illustrating the pathology progression prediction module 230 of the core assessment component 200, which is adopted in the AI system of the present invention to generate the multi-pathology progression prediction S5 based on the structured MRI data package S2, multi-tissue anatomical annotation S3, and multi-pathology detection S4. Referring to FIG. 9, the pathology progression prediction module 230 contains an IVD region locating unit (231 of FIG. 9), an IVD region measuring unit (232 of FIG. 9), an IVD region extracting unit (233 of FIG. 9), an IVD region standardizing unit (234 of FIG. 9), a pathology predicting unit (235 of FIG. 9), a pathology progression determining unit (236 of FIG. 9), and a memory (237 of FIG. 9).

The IVD region locating unit 231, IVD region measuring unit 232, IVD region extracting unit 233, and IVD region standardizing unit 234 of the pathology progression prediction module 230 are the same as the corresponding units of the pathology detection module (221, 222, 223, 224 of FIG. 8), which receive the structured MRI data package S2 and multi-tissue anatomical annotation S3, and transmit the standardized IVD region arrays (S331 of FIG. 9) to the pathology predicting unit 235.

The pathology predicting unit 235 receives the standardized IVD region arrays S331 and generates multi-pathology status prediction S341, which are transmitted to the pathology progression determining unit 236. The pathology predicting unit 235 adopts a AI deep learning model for the predicting task. For the pathologies with only two statuses, the AI deep learning model will predict whether the pathologies will be positive or negative in about 5 years. For the pathologies with more than two statuses, the AI deep learning model will predict the future grades of the pathologies in about 5 years.

The pathology progression determining unit 236 receives the multi-pathology status prediction S341 and multi-pathology detection S4, and generates the multi-pathology progression prediction S5, which is the final output of the pathology progression prediction module 230 of the core assessment component 200. The pathology progression status, including progression and non-progression, is determined based on the future status and detection result (current status) of each pathology. More specifically, for a pathology with two statuses, if the current status is negative and the future status is positive, the pathology is determined as progression; otherwise, the pathology is determined as non-progression. For the pathology with more than two statuses, if the future grade is larger than current grade, the pathology is determined as progression, otherwise the pathology is determined as non-progression.

The IVD region locating unit 231, IVD region measuring unit 232, IVD region extracting unit 233, IVD region standardizing unit 234, and pathology progression determining unit 236, are driven by the CPU processor, which performs all algebraic operations, logic operations, control tasks, and communication tasks in the IVD region locating, measuring, extracting, and standardizing units, as well as the pathology progression determining unit.

The pathology predicting unit 235 is driven by the CPU and the GPU processor. The CPU performs the control, communication, and logic operation tasks, and the GPU performs the major computational tasks of AI deep learning based pathology future status prediction, which requires intensive algebraic operations.

All units of the pathology progression prediction module 230 mentioned above (231, 232, 233, 234, 235 and 236) perform the high-intensity data interaction (S301, S302, S303, S304, S305 and S306 of FIG. 9) with the memory 237. The memory 237 saves the program codes instructing the CPU and the GPU operations, the intermediate data during the processing, and the AI deep learning model for the prediction of the future status of multiple pathologies. The program codes can be written with multiple programming languages including C, C++, Java, Python, etc. The AI deep learning model can be developed with multiple existing frameworks including CAFFE, TensorFlow, PyTorch, etc., and periodically updated with AI deep learning optimizing operation O3.

AI Deep Learning Optimization

Figure 10:
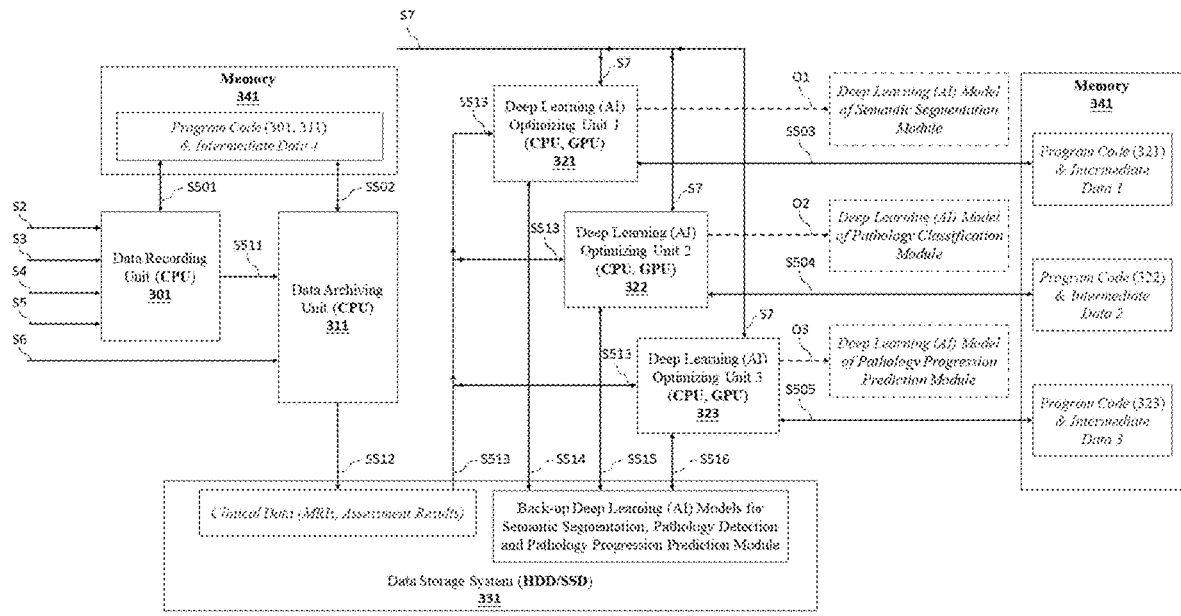
FIG. 10 is a diagram illustrating the model optimization component of the present invention.

FIG. 10 is a diagram illustrating the model optimization component 300, which is adopted in the AI system of the present invention to periodically optimize different AI deep learning models used in different modules of the core assessment component 200 via the corresponding AI deep learning optimizing operations O1, O2, O3, based on the structured MRI data package S2, MRI assessment results (includes multi-tissue anatomical annotation S3, multi-pathology detection S4, and multi-pathology progression prediction S5), specialist's comment S6, and control signal S7. Referring to FIG. 10, the model optimization component 300 contains a data recording unit (301 of FIG. 10), a data archiving unit (311 of FIG. 10), three AI deep learning optimizing units (321, 322, and 323 of FIG. 10), a data storage system (331 of FIG. 10), and a memory (341 of FIG. 10).

The data recording unit 301 merges the received structured MRI data package S2 and MRI assessment results S3, S4, S5 together, and transmits the structured MRI data package with assessment results (S511 of FIG. 10) to the data archiving unit 311. The structured MRI data package S2 is generated by the MRI standardization component. The importance score of the MRI description and items of the MRI assessment result in the structured MRI data package S2 are undetermined, so they are filled by 0. The data recording unit 301 merges the received data by assigning the MRI assessment results S3, S4, S5 generated by the core assessment component 200 to the corresponding undermined items of the structured MRI data package S2.

The data archiving unit 311 receives the structured MRI data package with assessment results S511 and specialist's comment S6, and archives the MRI data with clinical label (S512 of FIG. 10) in the data storage system 331. The data archiving unit 311 may correct the automated assessment results generated by the AI system and device, and assign the importance score to each MRI case, based on the specialist's comment S6. The corrected assessment results serve as the clinical label for the optimization of the AI deep learning model. The data archiving process will be described in detail below referring to FIG. 11.

The AI deep learning optimizing units 321, 322, 323 optimize the AI deep learning models of the semantic segmentation module 210, pathology detection module 220, and pathology progression prediction module 230, via the AI deep learning optimizing operations O1, O2, O3, respectively, which are based on the accumulated MRI data with clinical labels (S513 of FIG. 10) loaded from the data storage system 331. The AI deep learning optimizing units 321, 322, 323 receive the control signal S7 to trigger the AI deep learning optimizing operations O1, O2, O3, which adopt the standard transfer learning technology.

The AI deep learning optimizing unit 1 321 loads the back-up AI deep learning model for semantic segmentation module 210 (S514 of FIG. 10) and accumulated MRI data with clinical label S513 from the data storage system 331, and further trains the loaded AI deep learning model with the MRI image array and multi-tissue anatomical annotation results within the loaded MRI data. The AI deep learning optimizing operation O1 updates the AI deep learning model of the semantic segmentation module with the trained (optimized) AI deep learning model, which is also transmitted back to the data storage system 331 to update the back-up AI deep learning model for semantic segmentation module S514. The AI deep learning optimizing unit 2 322 and unit 3 323 adopt the same process for the AI deep learning optimizing operations of the pathology detection module O2 and the pathology progression prediction module O3, except that the AI deep learning optimizing unit 2 322 utilizes the MRI image array and multi-pathology detection results for training, and the AI deep learning optimizing unit 3 323 utilizes the baseline MRI image array and follow-up multi-pathology detection results for training.

The MRI case with a higher importance score will be assigned more weight in training. The AI deep learning optimizing operations O1, O2, O3 should be performed when a certain amount of new clinic MRI data (usually about 500 cases) is accumulated. The AI deep learning optimizing operations O1, O2, O3 are triggered by the control signal S7, which can be generated manually by an administrator of the AI system or automatically by an external timing devices for periodic optimization.

The data storage system 331 adopts the hard disk drive (HDD) or solid-state drive (SSD) for the long-term storage of clinic MRI data and back-up AI deep learning models. In the data storage system 331, the MRI data with clinical label is grouped by subject ID and sorted by date, and the AI deep learning models are saved with the structured data formats, such as HDF (HDF4, HDF5), JSON, etc. For the AI deep learning optimizing operations O1, O2, O3, the data storage system 331 will feed a part of the archived MRI data, which contains all newly accumulated MRI cases (i.e., cases that have not yet been used for optimization) and randomly selected old MRI cases, to the AI deep learning optimizing units 321, 322, 323. For each old MRI case, a higher importance score means a higher probability of being selected. After AI deep learning optimizing operations O1, O2, O3, the trained (optimized) AI deep learning models will be validated on all MRI cases used for optimization, and for each MRI case, if the assessment result generated by the trained (optimized) AI deep learning models has improved, the importance score will be reduced, otherwise, the importance score will be increased.

The data recording unit 301 and data archiving unit 311 are driven by the CPU processor, which performs all algebraic operations, logic operations, control tasks, and communication tasks in the data recording and archiving process.

The AI deep learning optimizing units 321, 322, 323 are driven by the CPU and the GPU processor. The CPU performs the control, communication, and logic operation tasks, and the GPU performs the major computational task of AI deep learning training (optimizing) process, which requires intensive algebraic operations.

All units of the model optimization component mentioned above (301, 311, 321, 322, and 323) perform the high-intensity data interaction (S501, S502, S503, S504 and S505 of FIG. 10) with the memory 341. The memory 341 saves the program codes instructing the CPU and GPU operations and the intermediate data during the processing. The program codes can be written with multiple programming languages including C, C++, Java, Python, etc.

Figure 11:
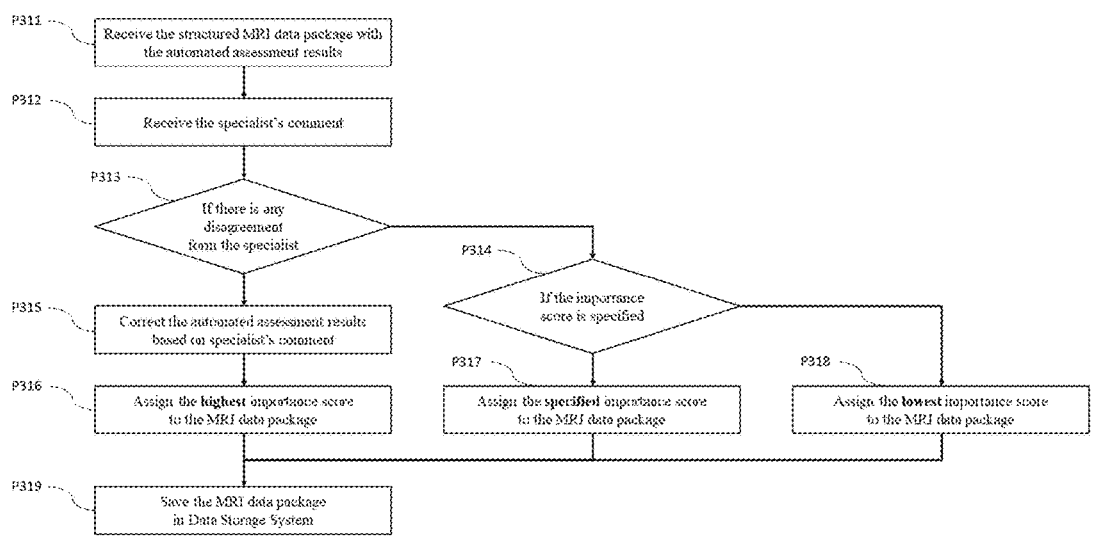
FIG. 11 is a flow chart of the clinical MRI data archiving process of the model optimization component of the present invention.

FIG. 11 is a flowchart illustrating the data archiving process, which corrects the automated assessment result and assigns the importance score of each MRI case based on the specialist's comment. Referring to FIG. 11, the structured MRI data package with automated assessment results and specialist's comment are received first (P311 and P312 of FIG. 11). Further, a determination is made as to whether there is any disagreement with the automated assessment results in the specialist's comments (P313 of FIG. 11). If there is any disagreement, the automated assessment results will be corrected accordingly (P315 of FIG. 11), and the structured MRI data package will be assigned the highest importance score (P316 of FIG. 11). Otherwise, a determination is made as to whether the importance score is specified in the specialist's comment (P314 of FIG. 11). If the importance score is specified, the specified importance score is assigned to the structured MRI data package (P317 of FIG. 11), otherwise, the lowest importance score is assigned to the structured MRI data package (P318 of FIG. 11). Further, the processed structured MRI data package is saved in the data storage system.

Examples of AI System and Device Deployment

Figure 12:
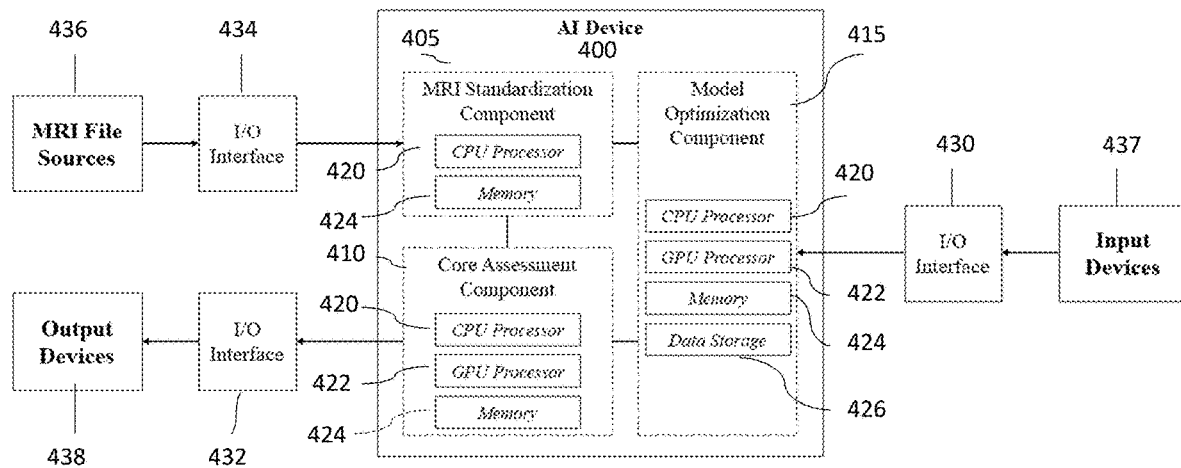
FIG. 12 is a diagram illustrating an example of the present invention for single clinical scale (personal level) application scenarios.
Figure 13:
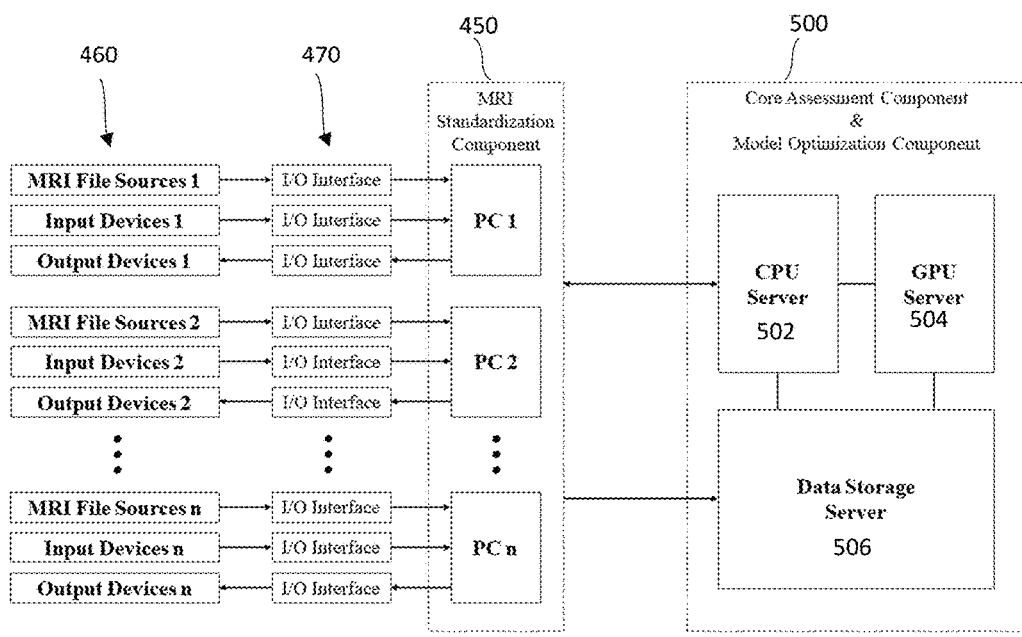
FIG. 13 is a diagram illustrating an example of the present invention for small scale (institutional level) application scenarios.
Figure 14:
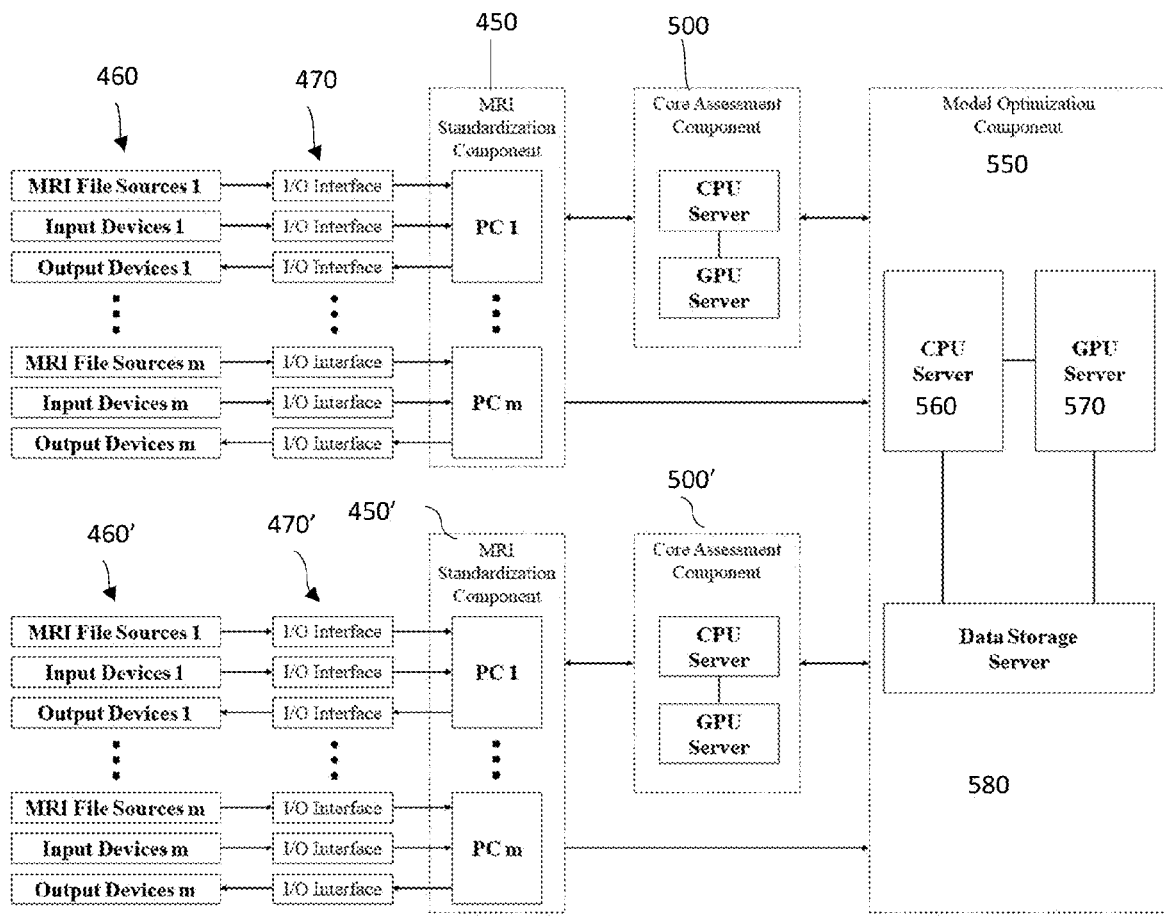
FIG. 14 is a diagram illustrating an example of the present invention for medium-large scale (regional level) application scenarios.

The AI system and device of the present invention is able to perform the same MRI assessment tasks in the application scenarios with different scales (different number of clinicians, patients, institutions, etc.), without adjusting the overall structure, workflow, and functional component division. All that is needed is to adopt different hardware (CPU processor, GPU processor, memory, data storage device, etc.) for the different computational power and data storage requirements. FIG. 12, FIG. 13, and FIG. 14 illustrate different deployment schemes of the AI system in a single clinic (personal level), small scale (institutional level), and medium-large scale (regional level) application scenarios.

FIG. 12 illustrates an example of the AI system and device for single clinic scale (personal level) application scenarios, such as a primary health care institution, single clinic, etc. All functional components, including the MRI standardization component 405, core assessment component 410, and model optimization component 415, are integrated into a portable AI device 400, which is the size of a personal laptop computer.

The CPU processor 420, GPU processor 422, and memory 424 are integrated into one single motherboard, which can be reused in different functional components, i.e. different modules of the CPU and GPU may perform the functions of the different components. As an alternative, each component may have its own separate CPU, GPU and memory. In either case the GPU is a specialized processor designed to rapidly manipulate and alter memory, and has a highly parallel structure for large scale algebraic operations. The memory 424 and data storage 426, can be HDD or SSD devices, which are also integrated into the AI device, and can be further extended with an external data storage device. Since all components are integrated together, no special device is required for the intra-system communication.

The AI device contains several common I/O interfaces 430, 432, including USB (type-A and type-C), Video Graphics Adapter (VGA), Digital Visual Interface (DVI), High-Definition Multimedia Interface (HDMI), etc., for communicating with external devices, 438. Besides, the AI device may contain special I/O interfaces 434 for communicating with MRI equipment 436. Moreover, the AI device may contain wireless communication device, such as a local area network (LAN), 5G network, etc., to assess the remote data. Several input and output devices 437, 438 including keyboard, display, etc., are also integrated into the AI device.

FIG. 13 illustrates an example of the AI system and device for small scale (institutional level) application scenarios, such as a large general hospital, large specialized hospital, etc. A set of personal computers (PC) serve as the MRI standardization component 450 of the AI system, which PCs are distributed in different clinics to collect and standardize the raw MRI files, and provide the interactions between the system and clinicians. Each PC is connected to a set of MRI File Sources and Input/output devices 460 through individual I/O interfaces 470. The MRI standardizing process does not require a large amount of computational power and data storage, which can be supported by the CPU processor and memory within common office PCs. Besides, the PC usually contains multiple I/O interfaces, wireless communication device, and external devices, which are sufficient to support the data interaction between the AI system and MRI sources/clinicians.

The core assessment and model optimization components 500 of the AI system are driven by a CPU server 502, a GPU server 504, and a data storage server 506. The CPU server 502 and GPU server 504 are hardware upgrades of the CPU processor and GPU processor previously discussed, which can provide much more computational power to handle the peak MRI assessment demand of the whole institution. The data storage server 506 is a hardware upgrade of the single HDD or SSD device, which can provide much more data storage capacity to archive clinic MRI data generated by the whole institution.

The CPU server, GPU server, and data storage server require a dedicated space, such as a central machine room or server room, which has a relatively high demand for environmental refrigeration and cleanliness. The communication between different functional components of the AI system requires special communication devices, such as LAN, 5G network, optical fiber.

FIG. 14 illustrates an example of the AI system and device for medium-large scale (regional level) application scenarios, such as multiple large hospitals in the same area, etc. Similar to the deployment strategy in the small scale (institutional level) application scenarios, MRI standardization components 450, 450' also consists of a set of PCs, and each PC is adopted for the MRI standardization and data interaction between the AI system and MRI sources/clinicians 460, 460' of each clinic through interfaces 470, 470'.

For each institution, the MRI data received from different clinics will be transmitted to a core assessment component 500, 500' supported by a CPU server and a GPU server, which will assess all MRI data from this institution. MRI data from different institutions within the region will be aggregated and archived to a data center 550, which is the model optimization component of the AI system and device and contains a more powerful CPU server 560, GPU server 570 and data storage server 580 for storing all MRI data of this region, and optimizing the deep learning models based on the MRI data of this region. The communication between different functional components of the AI system requires the wireless communication device, such as LAN, 5G network, etc.

The AI system and device for the application scenarios with different scales are compatible with each other. For example, the single clinic scale (personal level) AI device can be used as the MRI standardization component of a small scale (institutional level) or medium-large scale (regional level) AI system, and the small scale AI system can be merged into a medium-large scale AI system by uploading the MRI data to the regional data center and sharing the MRI data and AI deep learning models of this region.

Unsupervised Deed Learning Pipeline

As noted above, MRI is widely used in the diagnosis of intervertebral disc degeneration. [1] Most deep learning based vertebral segmentation methods require laborious manual labelling tasks. The present invention permits an unsupervised deep learning pipeline for vertebral segmentation of MR images by integrating the sub-optimal segmentation results produced by a rule-based method with a unique voting mechanism to provide supervision in the training process for the deep learning model. The present invention has been shown to have a high segmentation accuracy without relying on any manual labelling. Potential applications are in automated pathology detection and vertebral 3D reconstructions for biomechanical simulations and 3D printing, facilitating clinical decision making, surgical planning and tissue engineering.

Vertebral segmentation is an essential part of many lumbar MRI automated analysis tasks, such as pathology detection and vertebral 3D reconstruction for further mechanical simulations or 3D printing [2].

Prior art unsupervised segmentation methods are based on geometrical characteristics of the vertebrae [3-8], with specific templates, detectors or rules designed to identify and segment these. However, due to the complexity of the MR images, the accuracy and robustness of these unsupervised methods are low. Thus, they cannot be used for clinical practice. Supervised methods typically train a segmentation model using manually masked vertebrae, and apply it on new images [9-11]. Using a convolutional neural network (CNN) [12], supervised methods can achieve high segmentation accuracy [10-11]. However, the laborious manual segmentation task is still required for the training process of supervised algorithms.

Original spine MR images contain more than the required information for vertebral segmentation, which may increase the complexity of the learning task and reduce the accuracy of the output. Therefore, the present invention uses a regional convolutional neural network (CNN) strategy. The training and predicting process of the network are restrained to a specific vertebral region to filter out the irrelevant context. A voting mechanism integrating a set of sub-optimal segmentation results can provide satisfactory supervision for the training of a deep learning network. Thus, manual labels are not be required.

As indicated above, the present invention has the following steps: 1) selecting the region of interest (ROI) of each slice via a rule-based method; 2) integrating the ROIs via a voting mechanism to identify a volume of interest (VOI); and 3) training a CNN model to segment vertebrae within the identified VOI.

Dataset and Pipeline

A trial was set up to prove the features of the present invention. The trial included 243 volunteers who were recruited by open advertisement if they were above 18 years old without any cancers and previous spinal surgeries. Their lumbar MR images were collected and used for the testing of the present invention. The resolution of these images was 448×448. There were more than 15 slices in each MRI series. The average vertebral area in the MR images was 1650 pixels (range 800-2200), the average vertebral height was 40 pixels (range 30-55), and the average vertebral perimeter was 140 pixels (range 100-200), indicating the diversified nature of the dataset.

Figures 15A, 15B, 15C, 15D, 15E:
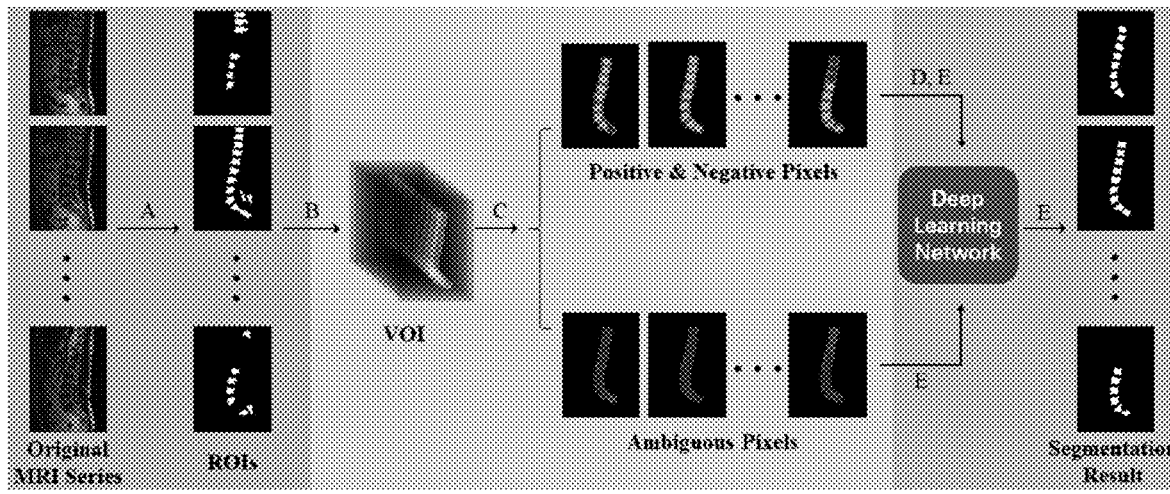
FIG. 15A is the rule-based ROI detection component of the MRI sequential flow pipeline of the present invention.
FIGS. 15B and 15C represent the volume of interest (VOI) generation and triaging.
FIGS. 15D and 15E represent the network training and vertebral segmentation components of the present invention.

The test procedure consisted of 3 major components, 1) the ROI detection (FIG. 15A: blue), 2) the voting mechanism (FIGS. 15B and C: pink), and 3) the CNN (FIGS. 15D and E: green). The ROI detection is a rule-based vertebral detection process used to identify the ROI in each MRI slice. During the voting mechanism, ROIs of all slices were integrated to generate the VOI of the series (FIG. 15B), and then the pixels in the VOI were classified as 1) the vertebrae (positive pixels), 2) likely to be the vertebrae (ambiguous pixels) and 3) not the vertebrae (negative pixels). FIG. 15C. In the last component of the CNN-based vertebral segmentation (FIG. 15D), the network was trained by positive pixels and negative pixels to segment all the vertebrae in a VOI. FIG. 15E.

Rule-Based ROI Detection

The ROI of each MRI slice was defined as the vertebral regions identified by the rule-based detecting process (FIG. 16A). The local normalization [13] was first adopted to eliminate the pixel intensity variation in different tissues and to highlight vertebral edges (FIG. 16B). The vertebral edges were then further enhanced with a Sobel filter, and after local thresholding, we obtained a binary mask in which the vertebrae were separated (FIG. 16C). ROIs were all connected components in the mask having an area and perimeter within the range of vertebrae (FIG. 16D).

Voting Mechanism

The VOI of each MRI series consisted of all pixels that might belong to the vertebrae. Due to the consistent location of the vertebrae on each MRI slice, the VOI cross-section in different slices was the same. Due to spinal pathologies and the limited identification ability of the rule-based method, there were some errors in the ROIs, such as missing vertebrae and mistaken selection of non-vertebral regions FIG. 16D). Therefore, a novel voting mechanism was used to integrate the sub-optimal ROIs and identify the VOI of a MRI series.

In the following statements, the ROI of slice i and the VOI are denoted as ROIi (x, y) and VOI(x, y). ROIi (x, y)=1, if the pixel at (x, y) is in the ROI of slice i; ROIi (x, y)=0, if it is not. A similar definition holds for VOI (x, y).

The process of voting included:

Step 1: Assign weights to all pixels in ROIs and create a weight map for each MRI slice. Since the pixels at the edge of ROIs were more likely to be misjudged than those at the center, the central pixels were assigned more weight. The weight map of slice i, denoted as Wi (x, y), is defined as:

$$W_i(x, y) = \begin{cases} w_c ROI_i(x, y), & d(x, y, B_1) \geq d_e \\ w_e ROI_i(x, y), & d(x, y, B_1) < d_e \end{cases} \quad (1)$$

where $W_c$ and $W_e$ represent the weight assigned to central and edge pixels, $d_e$ is the cut-off for the separation of ROI center and edge, $B_1=\{(x, y)|ROI_i(x, y)=0\}$, and the d(x, y, $B_1$) represents the distance from (x, y) to $B_1$, which is defined as:

$$d(x, y, B_1) = \min_{(a,b) \in B_1} \sqrt{(x-a)^2 + (y-b)^2} \quad (2)$$

Step 2: Calculate the voting result V(x, y) as:

$$V(x,y) = \Sigma_i^N W_i(x,y) \quad (3)$$

where N represents the number of MRI slices.

Step 3: Define the vertebra central region Rvc in the VOI as:

$$R_{vc} = \{(x,y)|V(x,y) \geq T_h, d(x,y,B_2) \geq h_{ave}/8\} \quad (4)$$

where $T_h$ is the higher voting cut-off, $h_{ave}$ is the average vertebral height and $B_2=\{(x, y)|V(x, y)<T_h\}$ Step 4: Define the potential vertebral region $R_{pv}$ in the VOI as:

$$Rpv = \{(x,y)|V(x,y) \geq T_l\} \quad (5)$$

where $T_l$ represents the lower voting cut-off.

Step 5: Check each connected component Ci in Rpv, and select it if Ci∩Rvc≠∅. The determined vertebral region Rdv in the VOI consisted of all the selected connected components.

Step 6: In case some vertebral pixels were not identified in any ROI, the neighborhood of Rdv was also merged in the VOI. Therefore, the VOI is defined as (FIG. 17A):

$$VOI(x, y) = \begin{cases} 1, & d(x, y, Rdv) \leq d_n \\ 0, & d(x, y, Rdv) > d_n \end{cases} \quad (6)$$

where $d_n$ represents the maximum neighborhood distance.

Based on the voting result and the ROIs, the pixels in a VOI could be further classified into 3 categories: positive pixels, ambiguous pixels and negative pixels. These three categories for slice i (FIG. 17B), denoted as $Pos_i$, $Amb_i$ and $Neg_i$, are defined as follows:

$$Posi = \{(x,y)|ROI_i(x,y)=1, V(x,y) \geq T_p\} \quad (7)$$

$$Negi = \{(x,y)|V(x,y)=0\} \quad (8)$$

$$Ambi = \{(x,y)|(x,y) \in Pos_i \cup Neg_i\} \quad (9)$$

where the $T_p$ represents the positive voting cut-off, and (x, y) satisfies VOI(x, y)=1.

The positive pixels were identified in most ROIs and had a high probability of belonging to vertebrae, while the negative pixels were in the VOI but not included in any ROI.

Deep Learning Based Vertebrae Segmentation

A convolutional neural network (CNN) was trained to further segment vertebrae from the VOI. Unlike the conventional network training process, in the pipeline of the present invention no manual labels were involved. Instead, the system relies on the positive and negative pixels in the VOIs to provide supervision.

The input of the CNN was a combination of the original MRI image (FIG. 18A), the local normalized image (FIG. 18B) and the edge detection results (FIG. 18C). Since the local context was enough for segmentation, the network received a small patch of input images of size 24×24, one at a time, and could sufficiently determine whether the center pixel of the patch belonged to the vertebrae. To improve the localization sensitivity of the model, coordinate channels [14] were introduced, which were two constant matrices of the same size as the input patches. FIG. 18D The coordinate channels indicated the relative position of each pixel in the input patch, which could help the network to better understand the spatial distribution of features. Input to the network was processed by 3 successive convolution (Cony) blocks, each containing two convolutional layers with a kernel size of 3×3, and one max-pooling layer of kernel size 2×2. FIG. 18E After each Cony block, the channels were doubled. Two fully connected layers followed the Cony blocks with 1024 hidden units. All convolutional layers and fully-connected layers were activated via Rectified Linear Unit (ReLU) (FIG. 18F), and the output layer was activated by softmax [12]. FIG. 18G The output of the network was the probability that the center pixel of the input patch belonged to the vertebrae. After inferring all pixels in the VOI, the vertebral segmentation result was obtained.

The training process of the network could be divided into pre-training and fine-tuning. In the pre-training process, the same number of positive and negative pixels are selected randomly from all MRI series to train the network. Then the pre-trained model is fine-tuned on each MRI series to deal with individual differences. All positive and negative pixels from the MRI series were used in the fine-tuning. The optimized model was used to segment all vertebrae in the VOI of the MRI series.

Sagittal lumbar MRIs obtained from the 234 patients were used for the validation of the present invention pipeline, with the mid-9 slices selected for segmentation. In the voting process, the weight of center pixels $W_c$ and edge pixels we were set to 2 and 1, respectively. The $d_e$ and $d_n$ were both set to 5. The $T_h$, $T_i$ and $T_p$ were set to 8, 1 and 4, respectively.

In the pre-training process, 100,000 positive pixels and 100,000 negative pixels were selected randomly from all MRI series. The pre-training took 5 epochs, and the fine-tuning generally took 1-3 epochs, depending on the different MRI images. Stochastic gradient descent (SGD) was used to optimize the model in both the pre-training and fine-tune stages.

Preliminary test results of the pipeline (FIG. 19B) were visually compared with the results of the rule-based method (FIG. 19A). By comparing the present invention with the prior results, it can be seen that the present invention achieves significantly higher segmentation accuracy by eliminating any missing vertebrae and image distortion.

Thus, the present invention represents a novel unsupervised vertebral segmentation pipeline for sagittal lumbar MR images. It demonstrates high segmentation accuracy without relying on manual labels by adopting a regional CNN strategy in the pipeline. An ROI is determined first in each slice by a rule-based method and then it is integrated through a unique voting mechanism to produce a VOI. The parameters in the rule-based ROI detection are empirically selected, but may need to be fine-tuned on another dataset. Since the ROI can be suboptimal, the fine-tuning process is simple. The pixels within the VOI are further divided into positive pixels, ambiguous pixels and negative pixels. The model is trained by the positive and negative pixels to segment all vertebrae. The training and segmenting process are both within the predefined VOI, with any information not necessary for the segmentation being filtered out.

Compared with previously reported supervised pipeline segmentation approaches [9-12] the present invention has the advantage of eliminating laborious manual labelling, while achieving comparable segmentation accuracy. In comparison with unsupervised methods [3-8], the present invention solves the issues of missing vertebrae and image distortion. These outcomes are due to the integrated CNN that is able to learn and detect vertebrae having a wide range of feature variations caused not only by underlying disease, but by inconsistencies in image quality since the MRIs were acquired by different machines and human operators. This system and process can be used with other medical imaging modalities, or even to segment other anatomical structures in MRIs.

The cited references in this application are incorporated herein by reference in their entirety and are as follows:

[1] C. W. Pfirrmann, A. Metzdorf, M. Zanetti, J. Hodler, and N. Boos, "Magnetic resonance classification of lumbar intervertebral disc degeneration," Spine, vol. 26, no. 17, pp. 1873-1878, 2001.
[2] J. S. Ramos, M. T. Cazzolato, B. S. Faiçal, M. H. Nogueira-Barbosa, C. Traina, and A. J. Traina, "3DBGrowth: volumetric vertebrae segmentation and reconstruction in magnetic resonance imaging," in 2019 IEEE 32nd International Symposium on Computer-Based Medical Systems (CBMS), 2019, pp. 435-440: IEEE.
[3] S. Benameur, M. Mignotte, S. Parent, H. Labelle, W. Skalli, and J. de Guise, "3D/2D registration and segmentation of scoliotic vertebrae using statistical models," Computerized Medical Imaging Graphics, vol. 27, no. 5, pp. 321-337, 2003.
[4] Z. Peng, J. Zhong, W. Wee, and J.-h. Lee, "Automated vertebra detection and segmentation from the whole spine MR images," in 2005 IEEE Engineering in Medicine and Biology 27th Annual Conference, 2006, pp. 2527-2530: IEEE
[5] M. S. Asian, A. Ali, D. Chen, B. Arnold, A. A. Farag, and P. Xiang, "3D vertebrae segmentation using graph cuts with shape prior constraints," in 2010 IEEE International Conference on Image Processing, 2010, pp. 2193-2196: IEEE.
[6] P. H. Lim, U. Bagci, and L. Bai, "Introducing Willmore flow into level set segmentation of spinal vertebrae," IEEE Transactions on Biomedical Engineering, vol. 60, no. 1, pp. 115-122, 2012.
[7] A. Rasoulian, R. Rohling, and P. Abolmaesumi, "Lumbar spine segmentation using a statistical multi-vertebrae anatomical shape+pose model," IEEE Transactions on Medical Imaging, vol. 32, no. 10, pp. 1890-1900, 2013.
[8] R. Korez, B. Ibragimov, B. Likar, F. Pernuš, and T. Vrtovec, "A framework for automated spine and vertebrae interpolation-based detection and model-based segmentation," IEEE Transactions on Medical Imaging, vol. 34, no. 8, pp. 1649-1662, 2015.
[9] S. M. R. A I Arif, K. Knapp, and G. Slabaugh, "Fully automatic cervical vertebrae segmentation framework for X-ray images," Computer methods programs in biomedicine, vol. 157, pp. 95-111, 2018.
[10] R. Janssens, G. Zeng, and G. Zheng, "Fully automatic segmentation of lumbar vertebrae from CT images using cascaded 3D fully convolutional networks," in 2018 IEEE 15$^{th}$ International Symposium on Biomedical Imaging (ISBI 2018), 2018, pp. 893-897: IEEE.
[11] J.-T. Lu et al., "Deepspine: Automated lumbar vertebral segmentation, disc-level designation, and spinal stenosis grading using deep learning," arXiv preprint arXiv: 10215, 2018.
[12] A. Krizhevsky, I. Sutskever, and G. E. Hinton, "Imagenet classification with deep convolutional neural networks," in Advances in neural information processing systems, 2012, pp. 1097-1105.
[13] M. Foracchia, E. Grisan, and A. Ruggeri, "Luminosity and contrast normalization in retinal images," Medical image analysis, vol. 9, no. 3, pp. 179-190, 2005.
[14] R. Liu et al., "An intriguing failing of convolutional neural networks and the coordconv solution," in Advances in Neural Information Processing Systems, 2018, pp. 9605-9616.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A system for fully automated comprehensive assessment of clinical lumbar magnetic resonance images, comprising:
a magnetic resonance images (MRI) standardization component that reads MRI data from raw lumbar MRI files with different formats, and converts the raw MRI data into standardized MRI data, and organizes the standardized MRI data into a structured MRI data package, wherein the standardized MRI data is a 3D array with a shape of (H, W,N), where H, W represent a height and width of each MRI slice, and N is a slice number of a MRI sequence, pixel value range of a MRI image array is normalized to [0,1) and a data type of the MRI image array is float 32;
a core assessment component automatically generates MRI assessment results which include multi-tissue anatomical annotation, multi-pathology detection and multi-pathology progression prediction based on the structured MRI data package, said core assessment component contains a semantic segmentation module that utilizes an unsupervised artificial intelligence (AI) deep learning pipeline to generate a multi-tissue anatomical annotation, a pathology detection module utilizes ana second AI deep learning pipeline to generate multi-pathology detection, and a pathology progression prediction module utilizes ana third AI deep learning pipeline to generate multi-pathology progression prediction; and a model optimization component that archives clinical MRI data and MRI assessment results based on comments provided by a specialist, and periodically optimizes the AI deep learning pipelines of the core assessment component.

2. The system of claim 1 wherein the pathology detection module comprises:

an intervertebral disc (IVD) region locating unit that receives the multi-tissue anatomical annotation and determine a position of each IVD region, respectively;

an IVD region measuring unit that receives the multi-tissue anatomical annotation and determine a size of each IVD region, respectively;

an IVD region extracting unit that receives the position and the size of each IVD region, respectively, as well as the structured MRI data package, and extracts a three dimensional (3D) IVD region array of each IVD from an MRI image array, each IVD region array contains a whole corresponding IVD, two adjacent vertebral endplates, and a spinal canal within a posterior region of the IVD;

an IVD region standardizing unit that receives a 3D IVD region array of each IVD from the MRI image array and converts the received 3D IVD region arrays to standardized IVD region arrays, the received 3D IVD region arrays have different sizes depending on an actual anatomical dimensions of IVD and the IVD region standardizing unit adopts an interpolation technology to convert the sizes of received 3D IVD region arrays to a standard size; and a pathology detection unit receives the standardized IVD region arrays and uses an AI deep learning model for an assessment of pathologies and provides the multi-pathology detection, the multi-pathology detection includes a classification and grading results for multiple pathologies within each IVD region array and the multi-pathology detection is the final output of the pathology detection module.

3. The system of claim 2 wherein the interpolation technology is one or more of nearest interpolation, linear interpolation, and bilinear interpolation.

4. The system of claim 2 wherein the IVD region of each intervertebral disc is a cuboid region, which is centered at and is parallel to the corresponding intervertebral disc, and wherein the IVD region locating unit determines the position of each IVD region by identifying a location and a rotation of each intervertebral disc based on the multi-tissue anatomical annotation; and wherein the IVD region measuring unit determines the size of each IVD region by measuring dimensions of spinal tissues based on the multi-tissue anatomical annotation.

* * * * *